(12) United States Patent
Kim et al.

(10) Patent No.: US 12,270,932 B2
(45) Date of Patent: Apr. 8, 2025

(54) ELECTRONIC DEVICE, METHOD, AND COMPUTER READABLE STORAGE MEDIUM FOR OBTAINING INFORMATION RELATED TO EXTERNAL OBJECT

(71) Applicant: SAMSUNG ELECTRONICS CO., LTD., Suwon-si (KR)

(72) Inventors: Hyunchul Kim, Suwon-si (KR); Yi Yang, Suwon-si (KR); Moonseok Kang, Suwon-si (KR); Jiho Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 335 days.

(21) Appl. No.: 17/854,737

(22) Filed: Jun. 30, 2022

(65) Prior Publication Data

US 2023/0074421 A1    Mar. 9, 2023

Related U.S. Application Data

(63) Continuation of application No. PCT/KR2022/007665, filed on May 30, 2022.

(30) Foreign Application Priority Data

Sep. 6, 2021  (KR) .................. 10-2021-0118702
Nov. 25, 2021  (KR) .................. 10-2021-0164043

(51) Int. Cl.
*G01S 7/02*  (2006.01)
*G01S 13/02*  (2006.01)
*G01S 13/87*  (2006.01)

(52) U.S. Cl.
CPC ........ *G01S 7/0234* (2021.05); *G01S 13/0209* (2013.01); *G01S 13/87* (2013.01)

(58) Field of Classification Search
CPC ..... G01S 7/0234; G01S 13/0209; G01S 13/87
(Continued)

(56) References Cited

U.S. PATENT DOCUMENTS 10,182,456 B2   1/2019  Damnjanovic et al.
11,190,712 B2   11/2021 Oh
(Continued)

FOREIGN PATENT DOCUMENTS

JP         6925568 B1    8/2021
KR    10-1666861 B1   10/2016
(Continued)

OTHER PUBLICATIONS

International Search Report (PCT/ISA/210) issued by the International Searching Authority on Sep. 1, 2022 in International Patent Application No. PCT/KR2022/007665.
(Continued)

*Primary Examiner* — James R Hulka
*Assistant Examiner* — Samarina Makhdoom
(74) *Attorney, Agent, or Firm* — Sughrue Mion, PLLC

(57) ABSTRACT

An electronic device includes an ultra-wide band (UWB) circuit, and at least one processor comprising a controller of UWB circuit. The at least one processor is configured to transmit, through UWB circuit operating in a first mode, a first signal for a first field in a first frame, transmit, through UWB circuit operating in the first mode, a second signal including designated information for a second field in the first frame, receive, through UWB circuit operating in the first mode, a first reflected signal related to the first signal and a second reflected signal related to the second signal, respectively, caused by an external object, according to a state of the designated information identified from the second reflected signal, obtain information on the external (Continued)

object based on the first reflected signal or transmit a second frame through UWB circuit operating in a second mode.

20 Claims, 24 Drawing Sheets

(58) Field of Classification Search
USPC ........................................................ 342/175
See application file for complete search history.

(56) References Cited

U.S. PATENT DOCUMENTS

| | | | |
|---|---|---|---|
| 11,656,319 B2 | 5/2023 | Choi et al. | |
| 2013/0244710 A1* | 9/2013 | Nguyen | H04B 15/00 455/501 |
| 2015/0265204 A1* | 9/2015 | Tupin, Jr. | G01S 13/88 600/301 |
| 2016/0341814 A1 | 11/2016 | Nguyen et al. | |
| 2016/0349362 A1 | 12/2016 | Rohr et al. | |
| 2020/0265698 A1* | 8/2020 | Eckert | G01S 13/06 |
| 2021/0051532 A1 | 2/2021 | Reddy et al. | |
| 2022/0120885 A1 | 4/2022 | Choi et al. | |
| 2022/0390554 A1 | 12/2022 | Murakami et al. | |
| 2023/0003876 A1 | 1/2023 | Homma et al. | |

FOREIGN PATENT DOCUMENTS

| | | | | |
|---|---|---|---|---|
| KR | 10-2017-0129497 A | | 11/2017 | |
| KR | 10-2020-0095691 A | | 8/2020 | |
| KR | 10-2021-0002906 A | | 1/2021 | |
| KR | 20210002906 A | * | 1/2021 | ............. G01S 13/04 |
| WO | 2021/117559 A1 | | 6/2021 | |
| WO | WO-2021171091 A2 | * | 9/2021 | ............. A61B 5/024 |

OTHER PUBLICATIONS

Written Opinion (PCT/ISA/237) issued by the International Searching Authority on Sep. 1, 2022 in International Patent Application No. PCT/KR2022/007665.

* cited by examiner

ELECTRONIC DEVICE, METHOD, AND COMPUTER READABLE STORAGE MEDIUM FOR OBTAINING INFORMATION RELATED TO EXTERNAL OBJECT

CROSS-REFERENCE TO RELATED APPLICATIONS

This application is a continuation application of International Application No. PCT/KR2022/007665, filed on May 30, 2022, which claims priority to Korean Patent Application No. 10-2021-0118702, filed on Sep. 6, 2021, and Korean Patent Application No. 10-2021-0164043, filed on Nov. 25, 2021, in the Korean Intellectual Property Office, the disclosures of which are incorporated by reference herein in their entireties.

BACKGROUND

1. Field

The disclosure relates to an electronic device, a method, and a computer-readable storage medium for obtaining information on an external object.

2. Description of Related Art

Ultra-wide band (UWB) communication technology may be used to obtain information on an external object through an electronic device. UWB communication technology may measure more accurate distance and angle when compared to radio access technology (RAT), which is distinct from UWB communication. In addition, the electronic device may obtain biometric information of the user of the electronic device through the UWB signal. For example, the electronic device may monitor the user's bio-signal through the UWB signal.

SUMMARY

An electronic device may transmit a signal to obtain information on an external object and receive a reflected signal. In a designated space, a plurality of electronic devices may transmit at least a plurality of signals to obtain information on an external object, and receive a plurality of reflected signals for the plurality of signals. Interference between the plurality of signals may occur.

The electronic device according to various embodiments may obtain information on an external object by avoiding interference between the plurality of signals.

The technical problems to be achieved in this document are not limited to those described above, and other technical problems not mentioned herein will be clearly understood by those having ordinary knowledge in the art to which the present disclosure belongs, from the following description.

According to an embodiment, an electronic device may comprise an ultra-wide band (UWB) circuit, at least one processor comprising a controller of UWB circuit, the at least one processor may be configured to: transmit, through the UWB circuit operating in a first mode, a first signal for a first field in a first frame; transmit, through the UWB circuit operating in the first mode, a second signal including designated information for a second field in the first frame, that is distinct from the first signal; receive, through the UWB circuit operating in the first mode, a first reflected signal related to the first signal and a second reflected signal related to the second signal, respectively, caused by an external object; according to a state of the designated information identified from the second reflected signal, obtain information on the external object based on the first reflected signal or transmit a second frame through the UWB circuit operating in a second mode switched from the first mode.

According to an embodiment, a method of an electronic device may comprise transmitting, through an UWB circuit operating in a first mode, a first signal for a first field in a first frame; transmitting, through the UWB circuit operating in the first mode, a second signal including designated information for a second field in the first frame, that is distinct from the first signal; receiving, through the UWB circuit operating in the first mode, a first reflected signal related to the first signal and a second reflected signal related to the second signal, respectively, caused by an external object; according to a state of the designated information identified from the second reflected signal, obtaining information on the external object based on the first reflected signal or transmit a second frame through the UWB circuit operating in a second mode switched from the first mode.

According to an embodiment, a computer readable storage medium may store one or more programs, the one or more programs including one or more instructions causing, when the electronic device to transmit, through an UWB circuit operating in a first mode, a first signal for a first field in a first frame, transmit, through the UWB circuit operating in the first mode, a second signal including designated information for a second field in the first frame, that is distinct from the first signal, receive, through the UWB circuit operating in the first mode, a first reflected signal related to the first signal and a second reflected signal related to the second signal, respectively, caused by an external object, according to a state of the designated information identified from the second reflected signal, obtain information on the external object based on the first reflected signal or transmit a second frame through the UWB circuit operating in a second mode switched from the first mode.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

The electronic device according to one or more embodiments may transmit a first signal for the first field and a second signal for the second field. The electronic device may receive a first reflective signal for the first signal and a second reflective signal for the second signal. The electronic device may obtain information on an external object based on the first reflected signal according to a state of the designated information identified from the second reflected signal. The electronic device may avoid interference with the external signal transmitted from the external electronic device by identifying the state of the designated information identified from the second reflected signal.

Figure 1:
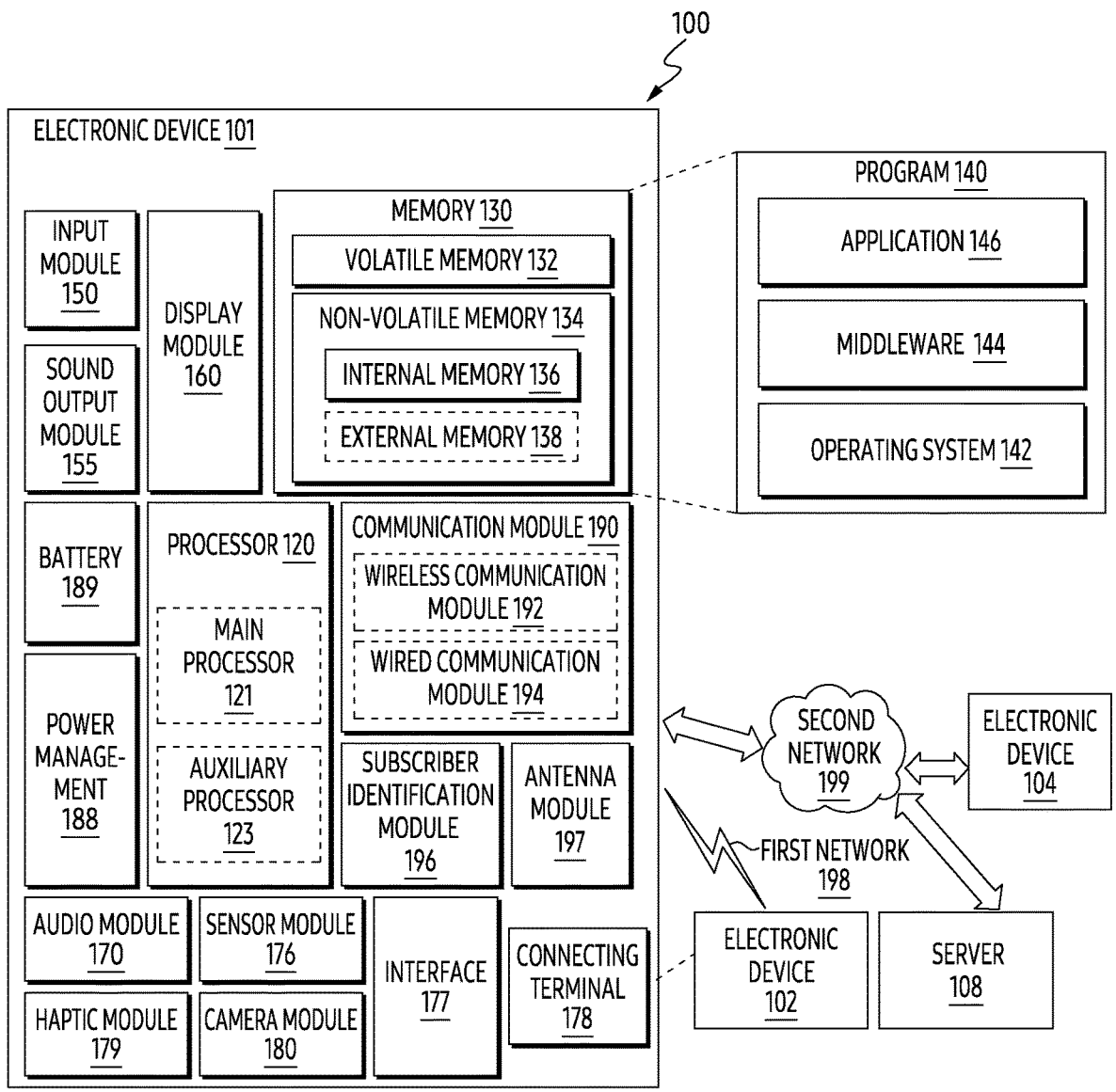
FIG. 1 is a block diagram of an electronic device in a network environment according to various embodiments.

FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, the processor (e.g., the processor 120 of FIG. 1) of the electronic device (e.g., the electronic device 101 of FIG. 1) may obtain information on an external object through a UWB signal (or frame). The processor may obtain information on an external object by transmitting a UWB signal and identifying a reflected signal for the UWB signal.

When the processor identifies a reflected signal for the UWB signal, the processor may receive another UWB signal transmitted from an external electronic device. According to an embodiment, the processor may distinguish between a reflected signal for the UWB signal transmitted by the processor and another UWB signal transmitted from an external electronic device by transmitting additional fields to the transmitted UWB signal.

An operation of a specific electronic device (or a processor of the electronic device) for the above-described embodiment may be described below. The electronic device described below may correspond to the electronic device 101 of FIG. 1. An external electronic device (or a plurality of external electronic devices) to be described below may correspond to the electronic device 102 of FIG. 1.

Figure 2:
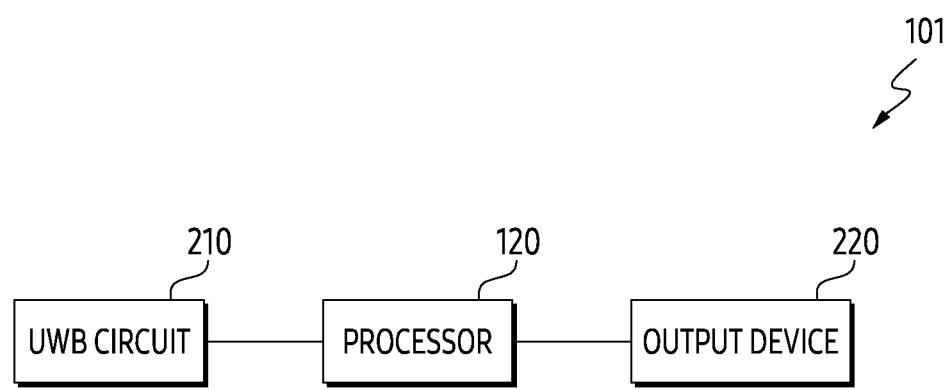
FIG. 2 is a simplified block diagram of an electronic device according to various embodiments.

FIG. 2 is a simplified block diagram of an electronic device according to various embodiments.

Referring to FIG. 2, the electronic device 101 of FIG. 2 may correspond to the electronic device 101 of FIG. 1. The electronic device 101 may comprise a processor 120, a UWB circuit 210, and/or an output device 220. According to an embodiment, the electronic device 101 may include at least one of a processor 120, a UWB circuit 210, and an output device 220. For example, at least some of the processor 120, the UWB circuit 210, and the output device 220 may be omitted in the electronic device 101.

According to an embodiment, the processor 120 may control the UWB circuit 210 and the output device 220. The UWB circuit 210 and the output device 220 may be controlled by the processor 120. For example, the processor 120 may transmit a UWB signal and receive the UWB signal through the UWB circuit 210. For example, the processor 120 may provide a notification to the user of the electronic device 101 through the output device 220.

The UWB circuit 210 may correspond to at least a part of the communication module 190 of FIG. 1. The UWB circuit 210 may be used for UWB communication. For example, the UWB circuit 210 may be used to transmit and/or receive a UWB signal. UWB communication may refer to a communication method that transmits information at low power by using a frequency band of a wider band than other communication methods.

According to an embodiment, the processor 120 may include at least a portion of the UWB circuit 210. For example, the processor 120 may include a controller (e.g., a micro controller unit (MCU) of the UWB circuit 210. The control unit of the UWB circuit 210 included in the processor 120 may operate independently of other components of the processor 120. For example, the processor 120 may transmit and/or receive a UWB signal. The control unit of the UWB circuit in the processor 120 may transmit and/or receive the UWB signal.

For example, the UWB signal may be transmitted and/or received through at least one of a plurality of channels. A plurality of channels may be variously set within a designated band. For example, a designated band and/or a plurality of channels may be set differently for each country and may be switched. For example, the designated band may be set to a band of 6.25 GHz to 8.25 GHz.

For example, the designated band may be divided into three groups based on the frequency band. Each group may include at least one channel. For example, the first group may be referred to as a sub-GHz band. The second group may be referred to as a low band. The third group may be referred to as a high band. For example, the first group may include a first channel (or channel 0). The second group may include second to fifth channels (or channels 1 to 4). The third group may include sixth to sixteenth channels (or channels 5 to 15).

The UWB signal may be configured as a pulse waveform. For example, a pulse period constituting the UWB signal may be set to 2 nanoseconds (ns). For example, the bandwidth of the UWB signal may be set to 500 MHz. However, this is not limited thereto. The UWB signal may be configured in various waveforms (e.g., a sine waveform), and the period and/or bandwidth of the UWB signal may be configured differently from the above-described example.

The UWB circuit 210 may include at least one antenna. At least one antenna may be configured as a directional antenna or a non-directional antenna (e.g., omnidirectional antenna).

For example, at least one antenna may be set to two. The at least one antenna may include a first antenna and a second antenna. The first antenna and the second antenna may be configured as a non-directional antenna. The first antenna may be used for transmitting a UWB signal. The second antenna may be used to receive a UWB signal. Transmission of the UWB signal and reception of the UWB signal may be performed independently. For example, the processor 120 may transmit a UWB signal while receiving the UWB signal through the UWB circuit 210. As another example, the processor 120 may receive the UWB signal while transmitting the UWB signal through the UWB circuit 210.

According to an embodiment, the UWB circuit 210 may be used to obtain biometric information of a user of the electronic device 101. For example, the processor 120 may monitor the user's non-contact biometric signal of the electronic device 101 through the UWB circuit 210. The processor 120 may transmit the UWB signal through the UWB circuit and receive the UWB signal reflected from the user of the electronic device 101. The processor 120 may obtain information on a channel impulse response (CIR) based on the reflected UWB signal. The processor 120 may obtain biometric information of the user of the electronic device 101 based on the information on the channel impulse response. For example, the biometric information may include information on breathing or heart rate. The processor 120 may obtain information on the movement of the user's chest of the electronic device 101 using the UWB signal. The processor 120 may obtain information on breathing or heart rate based on the movement of the user's chest of the electronic device 101.

Alternatively or additionally, the output device 220 may be used to provide a notification to a user of the electronic device 101. The output device 220 may be configured in various ways.

For example, the output device 220 may include the sound output module 155 of FIG. 1. The processor 120 may obtain information on an external object through the UWB circuit 210 and provide a notification to a user of the electronic device 101 through sound based on the obtained information on the external object.

As another example, the output device 220 may include the display module 160 of FIG. 1. The processor 120 may obtain information on an external object through the UWB circuit 210 and provide a notification to a user of the electronic device 101 through a screen based on the obtained information on the external object.

Figure 3A:
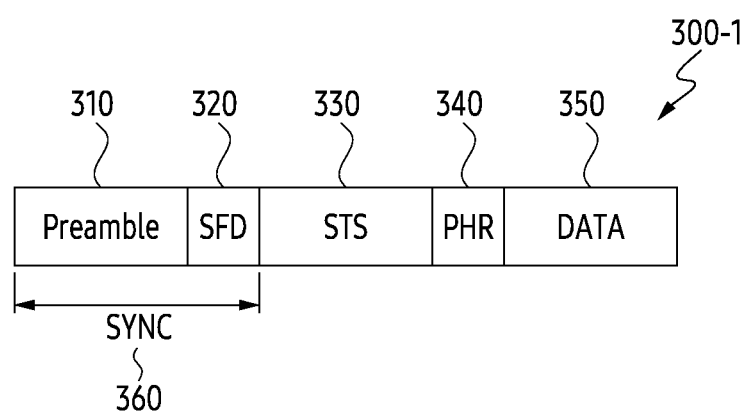
FIG. 3A illustrates an example of a frame constituting a UWB signal.

FIG. 3A illustrates an example of a frame constituting a UWB signal.

Referring to FIG. 3A, the frame 300-1 may include a preamble 310, a start of frame delimiter 320 (hereinafter, SFD 320), a scrambled timestamp sequence 330 (hereinafter, STS 330), a PHY header 340 (hereinafter, PHR 340), and a DATA 350. The frame 300-1 may be used to transmit and receive data through UWB communication. For example, the frame 300-1 may be transmitted and received through the UWB circuit 210 of the electronic device 101.

For example, the preamble 310 and the SFD 320 may be referred to as SYNC 360. For example, the SYNC 360 may be used for time synchronization for communication with an external electronic device. As another example, the preamble 310 may include information for recognizing that the signal received by the electronic device or the external electronic device is a UWB signal. The SFD 320 may be used to indicate the end of the SYNC 360. The SFD 320 may include information indicating that the end of the SYNC 360. The SFD 320 may include information for indicating an end point of the SYNC 360. According to an embodiment, the SYNC 360 may be configured to include only the preamble 310 except for the SFD 320.

For example, the preamble 310 and the SFD 320 may be configured based on symbols. Each of the preamble 310 and the SFD 320 may consist of a plurality of symbols. A symbol constituting a plurality of symbols may be configured based on a code sequence. The symbol may be configured based on a code sequence of one of a plurality of code sequences. According to an embodiment, a plurality of code indexes corresponding to each of a plurality of code sequences may be set. For example, the symbol may be configured based on a code sequence corresponding to the code index 9.

For example, the SFD 320 may be configured based on a sequence related to an arrangement of a plurality of symbols. An example of the sequence may be defined as Equation 1.

$$\text{Sequence} = [0 +1\ 0 -1 +1\ 0\ 0 -1] \qquad \text{[Equation 1]}$$

Referring to Equation 1, the SFD 320 may consist of eight symbols. The SFD 320 may be configured based on a sequence defined in Equation 1. The sequence may consist of 8 bits. The SFD 320 configured based on the sequence defined in Equation 1 may be set to [0 S 0–S S 0 0 –S]. S may mean one symbol. The sequence is exemplary, and SFD 320 may be configured based on various sequences. For example, the sequence may be configured based on a code sequence consisting of 64 bits.

For example, the STS 330 may be used for channel estimation, gain control, and/or security. The PHR 340 may include information on parameters of the physical layer of the DATA 350. The DATA 350 may include a payload.

Figure 3B:
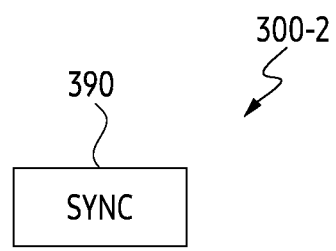
FIG. 3B illustrates another example of a frame constituting a UWB signal.

FIG. 3B illustrates another example of a frame constituting a UWB signal.

Referring to FIG. 3B, the frame 300-2 may be configured SYNC 390. For example, the SYNC 390 may correspond to the SYNC 360 of FIG. 3A. The frame 300-2 may not be used to transmit and receive data. For example, the frame 300-2 may be transmitted to identify a reflected signal by an external object. For example, the frame 300-2 may be transmitted by the processor 120 of the electronic device 101. The frame 300-2 may be reflected by an external object and received by the processor 120.

According to an embodiment, the processor 120 may transmit the frame 300-2 through the first signal. The processor 120 may receive a reflected signal for the first signal reflected by the external object. The processor 120 may obtain information on an external object based on the reflected signal. For example, the processor 120 may identify information on movement of an external object by identifying a Doppler frequency of the reflected signal. For example, the processor 120 may receive the reflected signal through different antennas. The processor 120 may obtain information on a direction in which an external object is located based on a phase difference of the reflected signals received through different antennas. For example, the processor 120 may obtain information on a distance between the external object and the electronic device 101 based on a timing of transmitting the first signal and a timing of receiving a reflected signal for the first signal.

According to an embodiment, the processor 120 of the electronic device 101 may obtain information on an external object by transmitting a UWB signal and receiving a reflected signal for the UWB signal. In addition, an external electronic device (e.g., the electronic device 104 of FIG. 1) distinguished from the electronic device 101 may also obtain information on an external object by transmitting a UWB signal and receiving a reflected signal for the UWB signal. Accordingly, a collision between the UWB signal transmitted by the electronic device 101 and the UWB signal transmitted by the external electronic device may occur. An example in which a collision between UWB signals occurs may be described with reference to FIG. 4.

Figure 4:
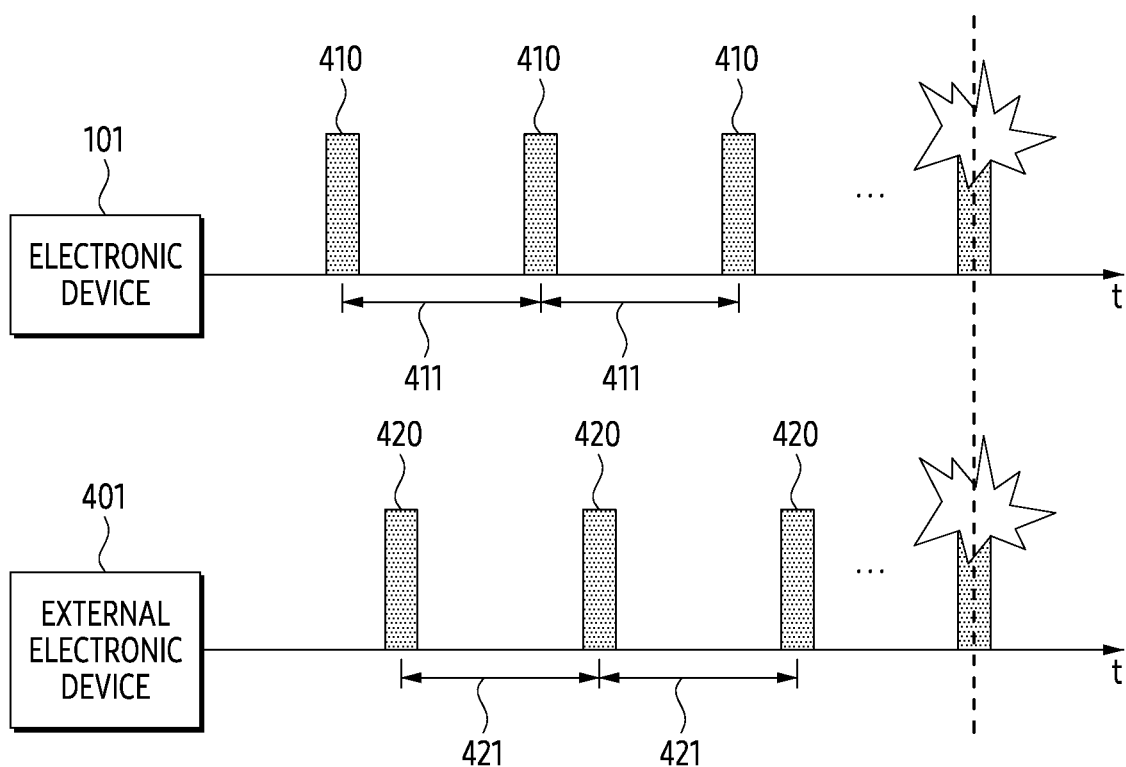
FIG. 4 illustrates an example in which a collision occurs between UWB signals according to various embodiments.

FIG. 4 illustrates an example in which a collision occurs between UWB signals according to various embodiments.

Referring to FIG. 4, the electronic device 101 may transmit the first UWB signal 410 based on the first period 411. The external electronic device 401 may transmit the second UWB signal 420 based on the second period 421.

For example, the first period 411 and the second period 421 may be set differently from each other. The first UWB signal 410 and the second UWB signal 420 may collide at each period corresponding to the lowest common multiple (LCM) of the first period 411 and the second period 421.

For another example, the first period 411 and the second period 421 may be set to be the same. Transmission timings of the first UWB signal 410 and the second UWB signal 420 may be set differently from each other. When the electronic device 101 transmits the first UWB signal 410 based on the first period 411, a time error may occur. In addition, even when the external electronic device 401 transmits the second UWB signal 420 based on the second period 421, a time error may occur. For example, the electronic device 101 and the external electronic device 401 may use their own clock. A unique error (e.g., skew or offset) may occur in each clock. When an error occurs in the first period 411 and the second period 421, a collision between the first UWB signal 410 and the second UWB signal 420 may occur.

As in the above examples, when the first UWB signal 410 and the second UWB signal 420 transmitted by the electronic device 101 are transmitted at different timings based on the same period, a collision may occur within a long time interval.

Hereinafter, a frame for preventing (or detecting) collision between UWB signals transmitted from different electronic devices and an operation of the processor 120 of the electronic device 101 transmitting the frame may be described.

Figure 5:
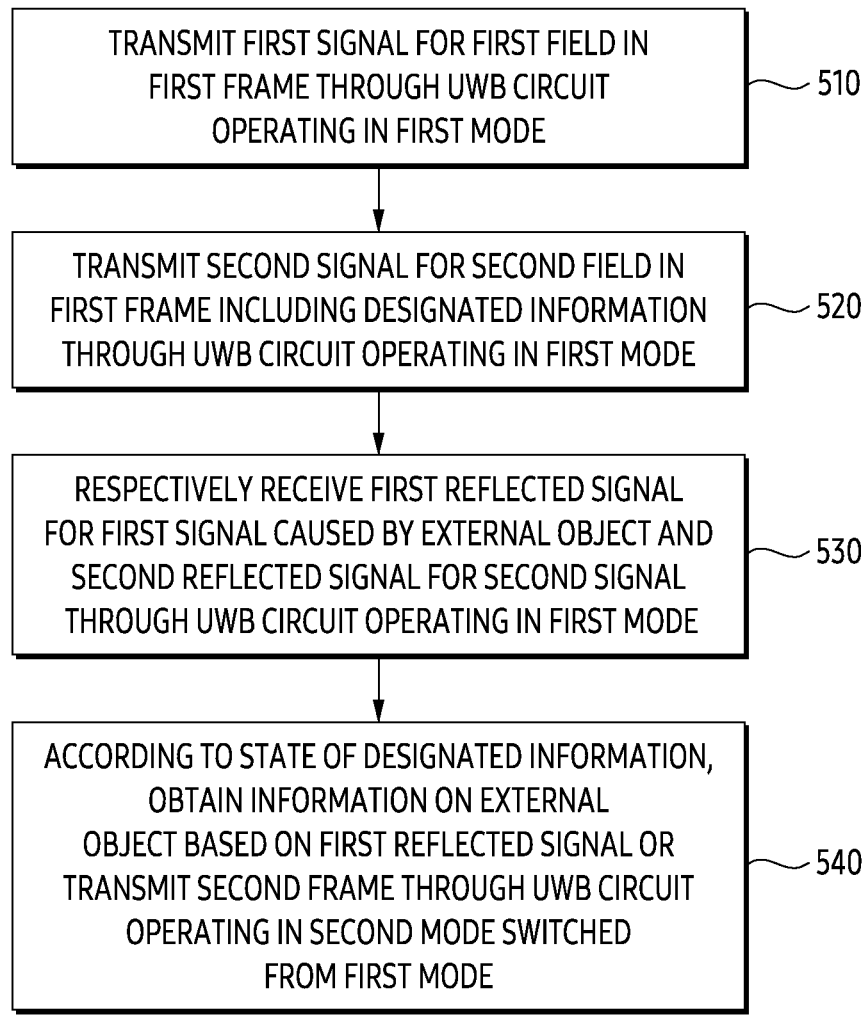
FIG. 5 is a flowchart illustrating an operation of an electronic device according to various embodiments.

FIG. 5 is a flowchart illustrating an operation of an electronic device according to various embodiments. This method may be executed by the electronic device 101 illustrated in FIG. 2 and the processor 120 of the electronic device 101.

In operation 510, the processor 120 may transmit a first signal for the first field in the first frame through a UWB circuit operating in the first mode.

The first frame may include a plurality of fields. For example, the first frame may include a first field and a second field. The first field may be used to obtain information on an external object. The second field may be used to prevent (or detect) collision of signals. For example, the first field in the first frame may correspond to SYNC 390 of FIG. 3B.

Alternatively or additionally, the processor 120 may transmit a first signal for the first field in the first frame. The processor 120 may transmit a first signal for the first field in the first frame to obtain information on the external object based on the first reflected signal for the first signal.

For example, the first frame may be transmitted through one signal. The first signal may refer to a part (or signal) transmitted within a first time interval among the one signal. The second signal may refer to a part (or signal) transmitted within a second time interval among the one signal. For example, the first signal may refer to a signal in a time interval in which a first field in the first frame is transmitted. The second signal may refer to a signal in a time interval in which a second field in the first frame is transmitted. As another example, the first frame may be transmitted through a plurality of signals. The first frame may be transmitted through a first signal and a second signal that are distinguished from each other.

For example, the first signal may include a UWB signal for transmitting the first field. For example, the first signal may refer to a signal transmitted by modulating the first field. For example, the first signal may be used to transmit at least one symbol for the first field.

The UWB circuit may operate in the first mode. For example, the processor 120 may transmit a first signal through a UWB circuit operating in the first mode. For example, the processor 120 may transmit the first frame based on the first period while the operation mode of the UWB circuit is the first mode. As another example, the processor 120 may transmit the first frame through the first channel while the operation mode of the UWB circuit is the first mode. As another example, the processor 120 may transmit the first frame based on the first offset while the operation mode of the UWB circuit is the first mode.

In operation 520, the processor 120 may transmit a second signal for the second field in the first frame including the designated information through the UWB circuit operating in the first mode. For example, the processor 120 may transmit a first field in the first frame through a first signal, and transmit the remaining second fields in the first frame through a second signal.

The second signal for the second field in the first frame may include designated information. The designated information may include information on the electronic device 101.

According to an embodiment, the designated information may include unique identification information of the electronic device 101. For example, the designated information may include a unique identification number (UID).

According to an embodiment, the designated information may include information on a designated sequence. For example, the second field may be configured as a SFD field. The SFD field may be configured based on a designated sequence. At least some of the first fields may be configured based on the first sequence. The second field may be configured based on the second sequence. The second sequence for configuring the second field may be distinguished from the first sequence for configuring at least some of the first fields.

For example, the first field may include a first SFD field. The first SFD field may be configured based on the first sequence. The second field may be configured a second SFD field. The second SFD field may be configured based on the second sequence.

According to an embodiment, the processor 120 may bypass an operation for measuring a channel state before performing operations 510 and 520. The processor 120 may skip an operation for measuring a channel state. The processor 120 may transmit a first signal (or a first signal and a second signal) instead of an operation for measuring a channel state. The processor 120 may prevent (or detect) a collision based on the second field. Accordingly, the processor 120 may transmit the first signal (or the first signal and the second signal) regardless of whether the channel state is a busy state or an idle state.

According to an embodiment, the processor 120 may transmit the second signal through the UWB circuit operating in the first mode after a designated time interval elapses from the timing at which the first signal is transmitted.

According to an embodiment, the processor 120 may transmit the second signal through a UWB circuit operating in the first mode immediately after the first signal is transmitted.

In operation 530, the processor 120 may receive a first reflected signal for a first signal and a second reflected signal for a second signal caused by an external object through the UWB circuit operating in the first mode.

For example, the processor 120 may receive one reflected signal for the first frame transmitted through one signal. The first reflected signal may refer to a part (or signal) received within the third period among the one reflected signals. The second reflected signal may refer to a part (or signal) received within a fourth time interval among the one reflected signal. For example, the first reflected signal may refer to a signal within a time interval in which a first field of the first frame is reflected and received. The second reflected signal may refer to a signal within a time interval in which the second field of the first frame is reflected and received.

For example, the processor 120 may receive one reflected signal for one signal for transmitting the first frame. The processor 120 may divide the one reflected signal into a part received within a third time interval and a part received within a fourth time interval. The processor 120 may identify the part received within the third time interval as the first reflected signal. The processor 120 may identify the part received within the fourth time interval as the second reflected signal.

For example, the processor 120 may divide and transmit a signal for the first frame. The processor 120 may divide the first frame into a first signal and a second signal and transmit the first frame. The processor 120 may receive a first reflected signal for the first signal and a second reflected signal for the second signal, respectively.

The first reflected signal for the first signal and the second reflected signal for the second signal may be caused by an external object. For example, the first signal and the second signal may be reflected by an external object. The first signal and the second signal may be reflected by the external object and received by the processor 120 as the first reflected signal and the second reflected signal, respectively.

The first reflected signal may be configured differently from the first signal. For example, the first reflected signal may further include noise (e.g., additive white gaussian noise (AWGN)) in the first signal. The second reflected signal may be configured differently from the second signal. For example, the second reflected signal may further include noise in the second signal.

In operation 540, the processor 120 may obtain information on the external object based on the first reflected signal or transmit the second frame through the UWB circuit operating in the second mode switched from the first mode according to the state of the designated information. For example, when the UWB circuit operates in the second mode, the processor 120 may transmit a second frame distinguished from the first frame. For another example, when the UWB circuit operates in the second mode, the processor 120 may transmit the second frame based on a period distinguished from a period in which the first frame is transmitted.

According to an embodiment, the processor 120 may identify a state of designated information identified from the second reflected signal.

The processor 120 may identify whether the designated information identified from the second reflected signal is in the same state as the designated information set when the second signal is transmitted. The processor 120 may identify whether the designated information identified from the second reflected signal is the same as the designated information set when the second signal is transmitted.

According to an embodiment, the processor 120 may identify that the state of the designated information identified from the second reflected signal is the first state. For example, the first state may be a state in which the state of the designated information set when the second signal is transmitted is the same as the state of the designated information identified from the second reflected signal. For example, the first state may be a state in which designated information set when the second signal is transmitted corresponds to designated information identified from the second reflected signal. For example, in the first state, the designated information identified from the second reflected signal may correspond to the designated information included in the second signal. The processor 120 may obtain information on an external object through information on a channel impulse response obtained from the first reflected signal, based on the state of the designated information identified from the second reflected signal being the first state.

For example, the processor 120 may identify that the designated information identified from the second reflected signal is the same state as the designated information set when the second signal is transmitted. The processor 120 may obtain information on a channel impulse response based on the designated information identified from the second reflected signal being in the same state as the designated information set when the second signal is transmitted. The processor 120 may obtain information on an external object based on the information on the channel impulse response.

According to an embodiment, the processor 120 may obtain information on a channel impulse response from the first reflected signal in response to receiving the first reflected signal. The processor 120 may identify whether information on the channel impulse response obtained from the first reflected signal is used according to the state of the designated information. The processor 120 may identify whether to obtain information on the external object based on the information on the channel impulse response obtained from the first reflected signal according to the state of the designated information.

According to an embodiment, the processor 120 may obtain information on a channel impulse response from the first reflected signal in response to receiving the first reflected signal. In addition, the processor 120 may obtain information on an external object based on the information on the channel impulse response obtained from the first reflected signal. The processor 120 may identify whether to use information on an external object according to a state of the designated information.

According to an embodiment, the processor 120 may store the first reflected signal in response to receiving the first reflected signal. Processor 120 may identify whether to obtain information on the channel impulse response from the first reflected signal according to the state of the designated information.

According to an embodiment, the processor 120 may transmit (or deliver) information on the channel impulse response to an upper layer (e.g., an application layer). According to an embodiment, the processor 120 may transmit (or deliver) information on the external object obtained based on the information on the channel impulse response to the upper layer.

For example, the information on the external object may include at least one of information on the shape of the external object, information on the location of the external object, and information on the movement of the external object. According to an embodiment, the information on the external object may include biometric information of the user of the electronic device 101, which is the external object.

Alternatively or additionally, the processor 120 may identify that the designated information identified from the second reflected signal is different from the designated information set when the second signal is transmitted. According to an embodiment, the processor 120 may identify that the state of the designated information identified from the second reflected signal is the second state. For example, the second state may be a state in which the state of the designated information set when the second signal is transmitted is different from the state of the designated information identified from the second reflected signal. For example, the second state may be a state in which designated information set when the second signal is transmitted and designated information identified from the second reflected signal are distinguished. The processor 120 may bypass the acquisition of information on an external object based on the state of the designated information identified from the second reflected signal being the second state. The processor 120 may skip the acquisition of information on an external object based on the state of the designated information identified from the second reflected signal being the second state. The processor 120 may not acquire information on an external object based on the state of the designated information identified from the second reflected signal being the second state.

The processor 120 may switch the operation mode of the UWB circuit from the first mode to the second mode. The processor 120 may transmit the second frame through the UWB circuit operating in the second mode switched from the first mode. Instead of acquiring information on an external object, based on the state of the designated information identified from the second reflected signal being the second state, the processor 120 may transmit the second frame after changing the operation mode of the UWB circuit from the first mode to the second mode.

Alternatively or additionally, the processor 120 may receive the first reflected signal before the second reflected signal. The processor 120 may store information on the first reflected signal in the memory (e.g., the memory 130 of FIG. 1). The information on the first reflected signal may include information on a channel impulse response obtained from the first reflected signal. After storing information on the first reflected signal, the processor 120 may decode the second reflected signal. The processor 120 may identify designated information based on decoding the second reflected signal. The processor 120 may identify a state of the designated information. The processor 120 may discard information on the stored first reflected signal based on the state of the designated information being the second state.

According to an embodiment, the processor 120 may transmit (or deliver) information regarding that the state of the designated information is identified as the second state to an upper layer (e.g., an application layer).

Alternatively or additionally, the processor 120 may switch the operation mode of the UWB circuit from the first mode to the second mode. According to an embodiment, the second mode may be set to be different from the first mode in at least one of a transmission period, a transmission offset, a transmission channel, or a code sequence.

For example, in a state in which the operation mode of the UWB is the first mode, the processor 120 may transmit the first frame based on the first period. After changing the operation mode of the UWB circuit from the first mode to the second mode, the processor 120 may transmit the second frame based on the second period. The processor 120 may transmit the second frame based on a second period distinguished from the first period through the UWB circuit operating in the second mode switched from the first mode. The processor 120 may transmit the first frame and the second frame based on different periods.

For another example, the processor 120 may transmit the first frame every first period based on the first offset in a state in which the operation mode of the UWB circuit is the first mode. After switching the operation mode of the UWB circuit from the first mode to the second mode, the processor 120 may transmit the second frame every first period based on the second offset distinguished from the first offset. The processor 120 may transmit the second frame every first period based on the second offset distinguished from the first offset through the UWB circuit operating in the second mode switched from the first mode.

As another example, the processor 120 may transmit the first frame through the first channel while the operation mode of the UWB is the first mode. After switching the operation mode of the UWB circuit from the first mode to the second mode, the processor 120 may transmit the second frame through a second channel distinguished from the first channel. The processor 120 may transmit the second frame through a second channel distinguished from the first channel through the UWB circuit operating in the second mode changed from the first mode.

As another example, in a state in which the operation mode of the UWB circuit is the first mode, the processor 120 may configure the first field based on a plurality of symbols. Each of the plurality of symbols may be configured based on a first code sequence. When the operation mode of the UWB circuit is in the second mode, the processor 120 may configure the second frame as a third field and a fourth field. The third field may be configured based on a plurality of symbols. Each of a plurality of symbols for configuring the third field may be configured based on a second code sequence.

According to an embodiment, the second frame may include a first field and a third field. For example, the third field may be configured based on a fourth sequence distinguished from a second sequence for configuring the second field. Both the first frame and the second frame may include a first field. The second field in the first frame and the third field in the second frame may be configured differently from each other.

Figure 6A:
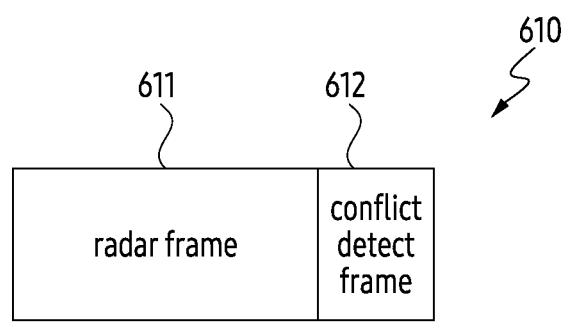
FIG. 6A illustrates an example of a frame according to various embodiments.

FIG. 6A illustrates an example of a frame according to various embodiments.

Referring to FIG. 6A, the frame 610 may be transmitted and received by the processor 120 of the electronic device 101. The frame 610 may include a radar frame 611 and a conflict frame 612 (hereinafter, CDF 612). The radar frame 611 may be an example of the first field of FIG. 5. The CDF 612 may be an example of the second field of FIG. 5.

For example, the processor 120 may transmit the frame 610 through one signal. The one signal may be divided into a first signal and a second signal according to a time interval. The one signal may be divided according to each time interval for transmitting each of the radar frame 611 and the CDF 612 of the frame 610. For example, the one signal may be divided into a first signal for the radio frame 611 and a second signal for the CDF 612. The first signal may be transmitted within the first time interval. The second signal may be transmitted within the second time interval. The processor 120 may receive one reflected signal for one signal for transmitting the frame 610. The one reflected signal may be divided into a first reflected signal and a second reflected signal according to a time interval. For example, the processor 120 may distinguish the one reflective signal into a first reflective signal and a second reflective signal for a second reflected signal.

For example, the radar frame 611 may be used to obtain information on an external object. The processor 120 may transmit a first signal for the radar frame 611. The processor 120 may obtain information on an external object based on the first reflected signal for the first signal.

The CDF 612 may include designated information. The processor 120 may transmit a second signal for the CDF 612. The processor 120 may identify a state of the designated information based on the second reflected signal for the second signal. The processor 120 may identify that the second signal transmitted from the electronic device 101 is reflected and received based on the CDF 612. The processor 120 may identify that the second signal transmitted from the electronic device 101 is reflected and received based on the CDF 612.

Figure 6B:
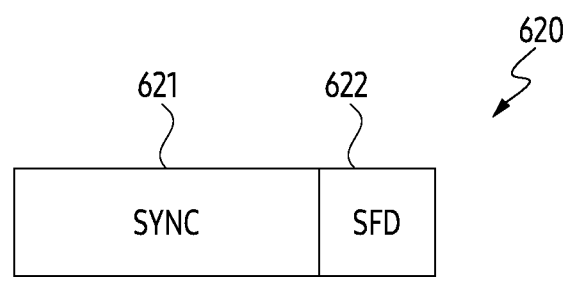
FIG. 6B illustrates another example of a frame according to various embodiments.

FIG. 6B illustrates another example of a frame according to various embodiments.

Referring to FIG. 6B, the frame 620 may be transmitted and received by the processor 120 of the electronic device 101. The frame 620 may include a SYNC 621 and an SFD 622. The SYNC 621 may be an example of the first field of FIG. 5. The SYNC 621 may be an example of the radar frame 611 of FIG. 6A. The SFD 622 may be an example of the second field of FIG. 5. The SYNC 621 may correspond to the SYNC 390 illustrated in FIG. 3B. The SFD 622 may be an example of the CDF 612 of FIG. 6A.

The processor 120 may transmit a first signal to the SYNC 621 and receive a first reflected signal to the first signal. The processor 120 may transmit a second signal to the SFD 622 and receive a second reflected signal to the second signal.

Although not shown, the SYNC 621 may include an SFD (or SFD field) distinguished from the SFD 622. The SFD included in the SYNC 621 may be configured based on the first sequence. The SFD 622 may be configured based on the second sequence. The first sequence and the second sequence may be configured independently. The processor 120 may independently configure the first sequence and the second sequence. For example, the processor 120 may configure the first sequence and the second sequence differently from each other. For another example, the processor 120 may configure the first sequence and the second sequence to be identical. For example, the first sequence may be set based on a standard (e.g., 802.15.4 standard). The second sequence may be set by the processor 120 regardless of the standard.

For example, each of the first sequence and the second sequence may be set to one of 4 bits, 8 bits, 16 bits, 32 bits, or 64 bits. For example, the first sequence may be set to 8 bits and the second sequence may be set to 8 bits. As another example, the first sequence may be set to 8 bits and the second sequence may be set to 64 bits. As another example, the first sequence may be set to 64 bits and the second sequence may be set to 8 bits. As another example, the first sequence may be set to 64 bits and the second sequence may be set to 64 bits.

Alternatively or additionally, the SFD 622 may include designated information. The SFD 622 may include information on the second sequence. The processor 120 may receive a second reflected signal of the second signal for the SFD 622. The processor 120 may identify the third sequence based on the second reflected signal. The processor 120 may identify a state of designated information identified from the second reflected signal based on the second sequence and the third sequence. For example, the processor 120 may identify whether the identified third sequence is the same as the second sequence based on the second reflected signal. For example, the processor 120 may identify the state of the designated information as the first state based on the third sequence identified based on the second reflected signal being the same as the second sequence. As another example, the processor 120 may identify the state of the designated information as the second state based on the third sequence identified based on the second reflected signal being different from the second sequence.

Figure 6C:
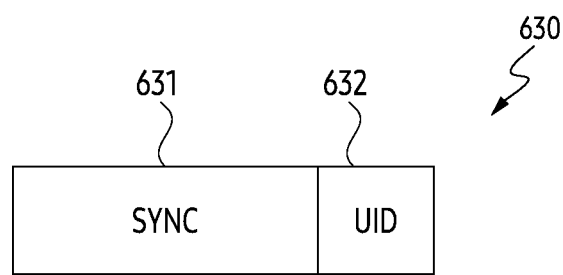
FIG. 6C illustrates another example of a frame according to various embodiments.

FIG. 6C illustrates another example of a frame according to various embodiments.

Referring to FIG. 6C, the frame 630 may be transmitted and received by the processor 120 of the electronic device 101. The frame 630 may include a SYNC 631 and a UID 632. The SYNC 631 may be an example of the first field of FIG. 5. The SYNC 631 may be an example of the radar frame 611 of FIG. 6A. The UID 632 may be an example of the second field of FIG. 5. The SYNC 631 may correspond to the SYNC 390 illustrated in FIG. 3B. The UID 632 may be an example of the CDF 612 of FIG. 6A.

The processor 120 may transmit a first signal to the SYNC 631 and receive a first reflected signal to the first signal. The processor 120 may transmit a second signal to the UID 632 and receive a second reflected signal to the second signal.

For example, the UID 632 may include unique identification information for the electronic device 101. The processor 120 may identify a state of the designated information based on unique identification information for the electronic device 101 set at the time of transmitting the second signal and unique identification information identified through the second reflected signal. For example, the processor 120 may identify the state of the designated information as the first state based on the unique identification information for the electronic device 101 set when the second signal is transmitted and the unique identification information identified through the second reflected signal being the same. As another example, the processor 120 may identify the state of the designated information as the second state based on the unique identification information for the electronic device 101 set when the second signal is transmitted and the unique identification information identified through the second reflected signal being different from each other.

Figure 7A:
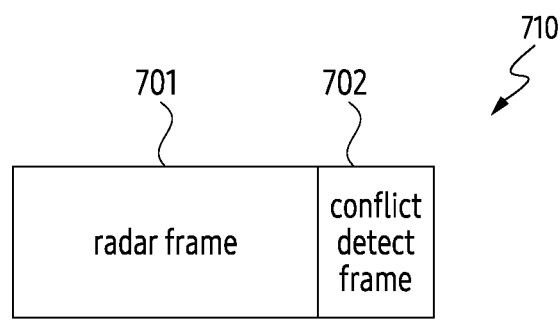
FIG. 7A illustrates another example of a frame according to various embodiments.

FIG. 7A illustrates another example of a frame according to various embodiments.

Figure 7B:
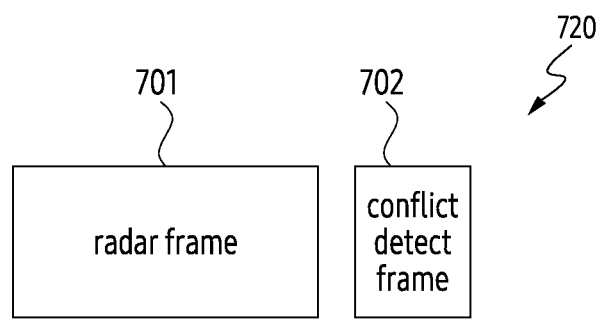
FIG. 7B illustrates another example of a frame according to various embodiments.

FIG. 7B illustrates another example of a frame according to various embodiments.

Figure 7C:
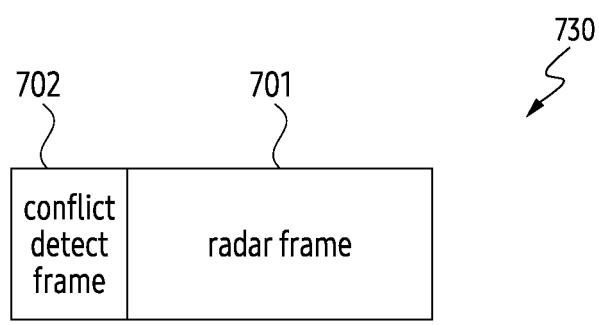
FIG. 7C illustrates another example of a frame according to various embodiments.

FIG. 7C illustrates another example of a frame according to various embodiments.

Figure 7D:
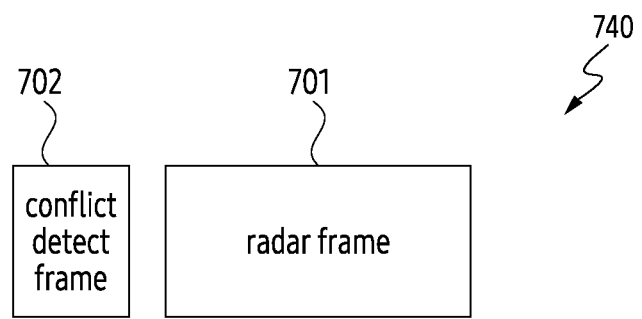
FIG. 7D illustrates another example of a frame according to various embodiments.

FIG. 7D illustrates another example of a frame according to various embodiments.

The frames 710, 720, 730, and 740 shown in FIGS. 7A, 7B, 7C, 7D, respectively, may be transmitted and/or received by the processor 120 of the electronic device 101.

Referring to FIG. 7A, a frame 710 may include a radar frame 701 and a conflict detect frame 702 (hereinafter, CDF 702). The processor 120 may transmit a radar frame 701. The processor 120 may transmit the CDF 702 immediately after transmitting the radar frame 701. The CDF 702 may be followed by radar frame 701. The CDF 702 may be transmitted after the radar frame 701 is transmitted.

Referring to FIG. 7B, the frame 720 may include a radar frame 701 and a CDF 702. The processor 120 may transmit the radar frame 701. The processor 120 may transmit the CDF 702 after a designated time interval elapses from the timing at which the radar frame 701 is transmitted. For example, the designated time interval may be set to 1 microsecond (μs).

Referring to FIG. 7C, the frame 730 may include a radar frame 701 and a CDF 702. The processor 120 may transmit the CDF 702. The processor 120 may transmit the radio frame 701 immediately after transmitting the CDF 702. The radar frame 701 may be followed by the CDF 702. The radar frame 701 may be transmitted after the CDF 702 is transmitted.

Referring to FIG. 7D, the frame 740 may include a radar frame 701 and a CDF 702. The processor 120 may transmit the CDF 702. The processor 120 may transmit the radio frame 701 after a designated time interval elapses from the timing at which the CDF 702 is transmitted. For example, the designated time interval may be set to 1 is.

Figure 8A:
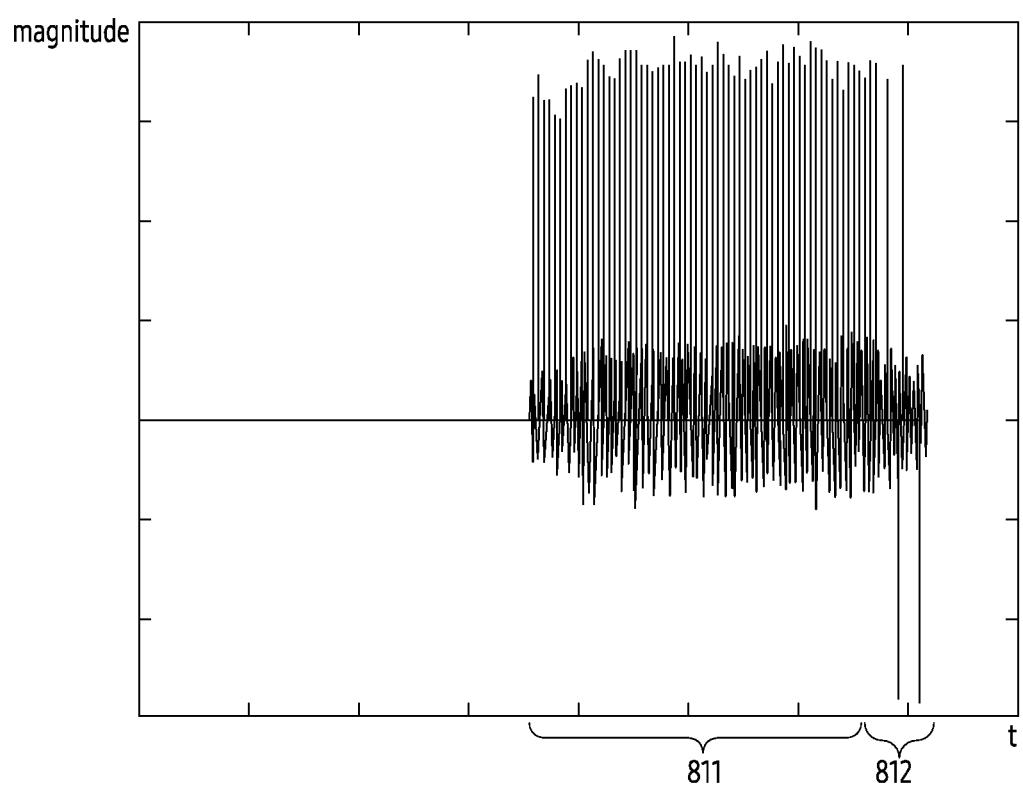
FIG. 8A illustrates an example of a reflected signal received by an electronic device according to various embodiments.

FIG. 8A illustrates an example of a reflected signal received by an electronic device according to various embodiments.

Figure 8B:
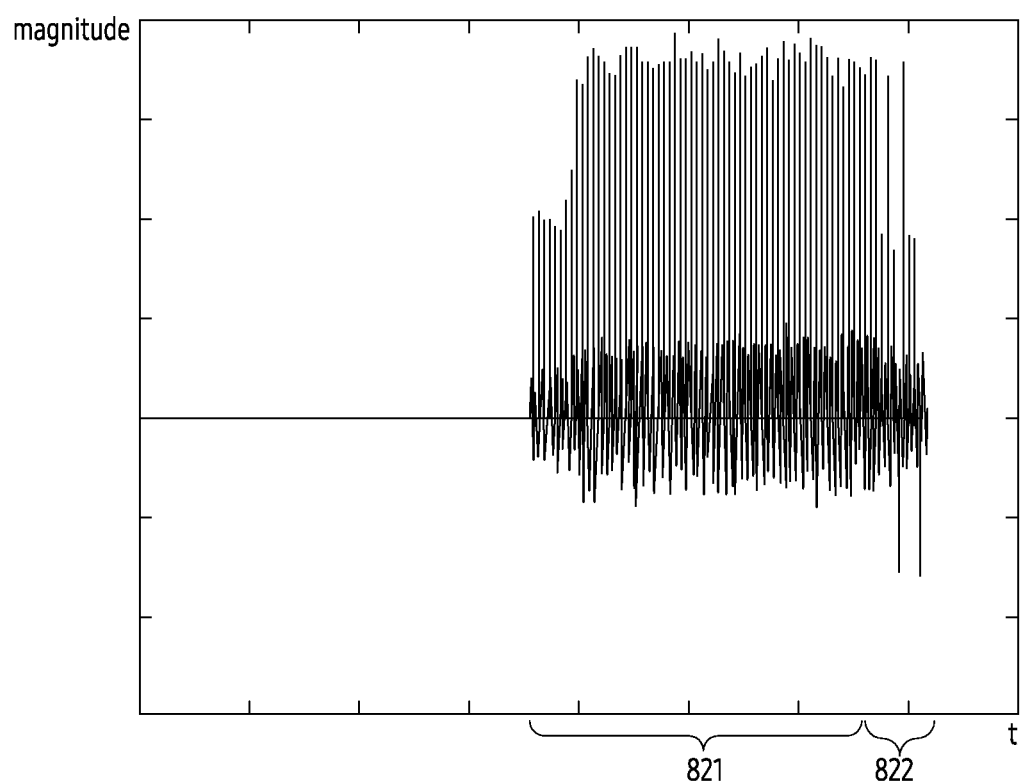
FIG. 8B illustrates an example of a reflected signal received by an electronic device according to various embodiments.

FIG. 8B illustrates an example of a reflected signal received by an electronic device according to various embodiments.

Figure 8C:
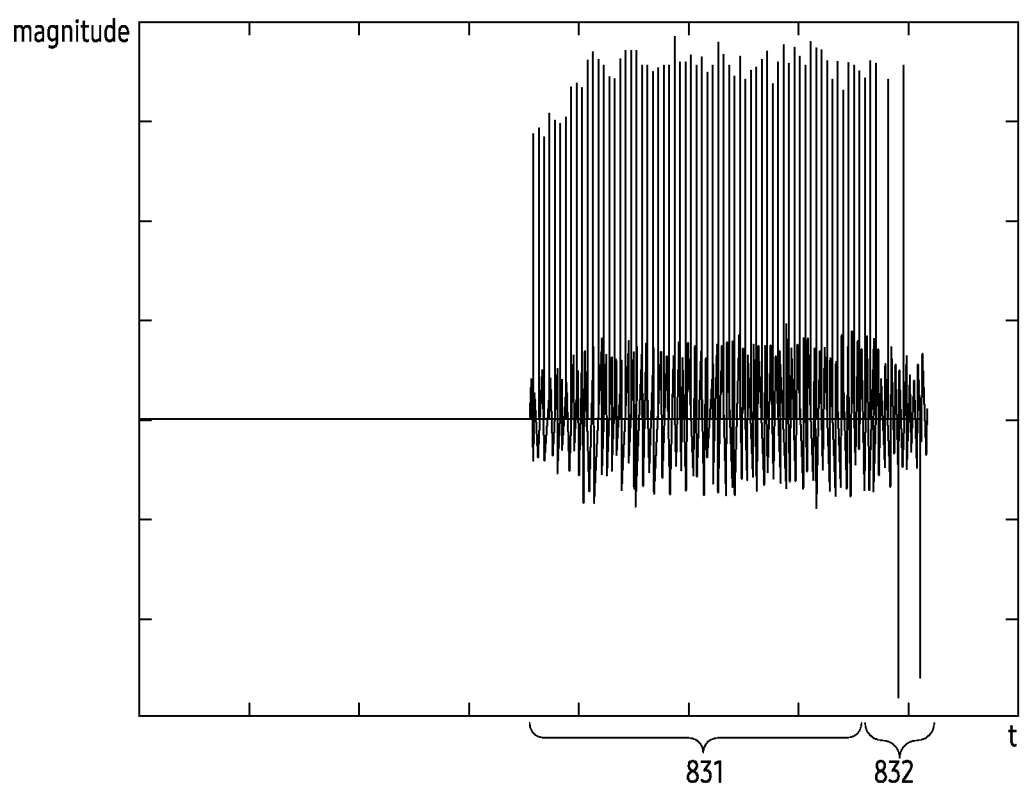
FIG. 8C illustrates an example of a reflected signal received by an electronic device according to various embodiments.

FIG. 8C illustrates an example of a reflected signal received by an electronic device according to various embodiments.

Referring to FIGS. 8A to 8C, an example of a reflected signal received from the processor 120 of the electronic device 101 is illustrated. The horizontal axis of the graphs of FIGS. 8A to 8C represents time. A vertical axis of the graphs of FIGS. 8A to 8C represents a magnitude.

The processor 120 may transmit the first frame through one signal. One signal for transmitting the first frame may be divided into a first signal for the first field and a second signal for the second field. For example, the processor 120 may transmit a first signal for a first field in the first frame and a second signal for a second field in the first frame.

The processor 120 may receive one reflected signal for the one signal. The one reflected signal may be divided into a first reflected signal for a first signal and a second reflected signal for a second signal. For example, the processor 120 may receive a first reflected signal for the first signal and a second reflected signal for the second signal. Graphs of FIGS. 8A to 8C may be examples of the first reflected signal and the second reflected signal received by the processor 120.

Referring to FIG. 8A, the processor 120 may transmit a first signal for a first field in the first frame and a second signal for a second field in the first frame. The processor 120 may set the second field as SFD. The processor 120 may configure the SFD based on a designated sequence. The processor 120 may set the designated sequence to [0, 1, 0, −1, 1, 0, 0, −1]. The processor 120 may sequentially receive a first reflected signal for the first signal and a second reflected signal for the second signal. The processor 120 may receive noise (e.g., AWGN) together with the first reflected signal and the second reflected signal. The processor 120 may receive the first reflected signal and the second reflected signal in a state in which interference from an external signal transmitted from another electronic device does not exist.

The processor 120 may receive the first reflected signal in the time interval 811. The processor 120 may receive the second reflected signal in the time interval 812. The processor 120 may identify a sequence based on the second reflected signal. For example, the processor 120 may identify the sequence based on the magnitude of the second reflected signal received within the time interval 812. In a state in which interference of an external signal transmitted from another electronic device does not exist, the processor 120 may identify a sequence identified based on the magnitude of the second reflected signal as [0, 1, 0, 0, 0]. The processor 120 may identify that the identified sequence is the same based on the magnitude of the second reflected signal as the designated sequence for configuring the second signal. The processor 120 may identify that the state of the designated information identified from the second reflected signal is the first state. The processor 120 may obtain information on an external object based on the state of the designated information identified from the second reflected signal being the first state.

Referring to FIG. 8B, the processor 120 may transmit a first signal for a first field in the first frame and a second signal for a second field in the first frame. The processor 120 may set the first field to SYNC. The processor 120 may set the second field as SFD. The processor 120 may configure the SYNC and the SFD based on a designated code sequence. The processor 120 may configure an arrangement of a plurality of symbols constituting the SFD based on a designated sequence. For example, the code sequence and the designated sequence may be distinguished. The code sequence may refer to a sequence for configuring each of a plurality of symbols constituting SYNC and SFD. The designated sequence may refer to a sequence for configuring an arrangement of a plurality of symbols constituting the SFD.

The processor 120 may set the designated sequence to [0, 1, 0, −1, 1, 0, 0, −1]. The processor 120 may receive the first reflected signal and the second reflected signal in a state where interference from an external signal transmitted from another electronic device exists. The external signal may include a third signal for the third field and a fourth signal for the fourth field. The third field and the fourth field may be configured based on the same code sequence as a designated code sequence for configuring the first field (e.g., SYNC) and the second field (e.g., SFD).

The processor 120 may receive the first reflected signal in the time interval 821. The processor 120 may receive the second reflected signal in the time interval 822. The processor 120 may identify a sequence based on the second reflected signal. For example, the processor 120 may identify the sequence based on the magnitude of the second reflected signal received within the time interval 822. In a state in which interference of an external signal transmitted from another electronic device exists, the processor 120 may identify the identified sequence as [1, 1, 1, −1, 1, 1, 1, −1] based on the magnitude of the second reflected signal. The processor 120 may identify that the designated sequence for configuring the second signal and the identified sequence based on the magnitude of the second reflected signal are different from each other. The processor 120 may identify that the state of the designated information identified from the second reflected signal is the second state. Based on the state of the designated information identified from the second reflected signal being the second state and the interference of external signals, the processor 120 may switch the operation mode of the UWB circuit from the first mode to the second mode. The processor 120 may transmit the second frame through the UWB circuit operating in the second mode.

Referring to FIG. 8C, the processor 120 may set the designated sequence to [0, 1, 0, −1, 1, 0, 0, −1]. The processor 120 may receive the first reflected signal and the second reflected signal in a state in which interference from an external signal transmitted from another electronic device exists. The external signal may include a third signal for the third field and a fourth signal for the fourth field. The third field and the fourth field may be configured based on a code sequence distinct from a designated code sequence for configuring the first field (e.g., SYNC) and the second field (e.g., SFD).

The processor 120 may receive the first reflected signal in the time interval 831. The processor 120 may receive the second reflected signal in the time interval 832. The processor 120 may identify a sequence based on the second reflected signal. For example, the processor 120 may identify the sequence based on the magnitude of the second reflected signal received within the time interval 832. In a state in which interference of an external signal transmitted from another electronic device exists, the processor 120 may identify the identified sequence based on the magnitude of the second reflected signal as [0, 1, 0, −1, 1, 0, 0]. The processor 120 may identify that the identified sequence is the same as the designated sequence for configuring the second signal and the designated sequence based on the magnitude of the second reflected signal. The processor 120 may identify that the state of the designated information identified from the second reflected signal is the first state. The processor 120 may obtain information on the external object based on the first state as the state of the designated information identified from the second reflected signal.

Referring back to FIGS. 6A to 6C, when the processor 120 uses a code sequence distinguished from a code sequence used by the external electronic device to configure an external signal (or frame), the processor 120 may identify the state of the designated information identified from the second reflected signal as the first state, even with the interference of the external signal. Accordingly, the processor 120 may configure the first frame based on a code sequence distinguished from a code sequence used by the external electronic device to configure an external signal (or frame) in order to avoid interference with the external signal.

Figure 9:
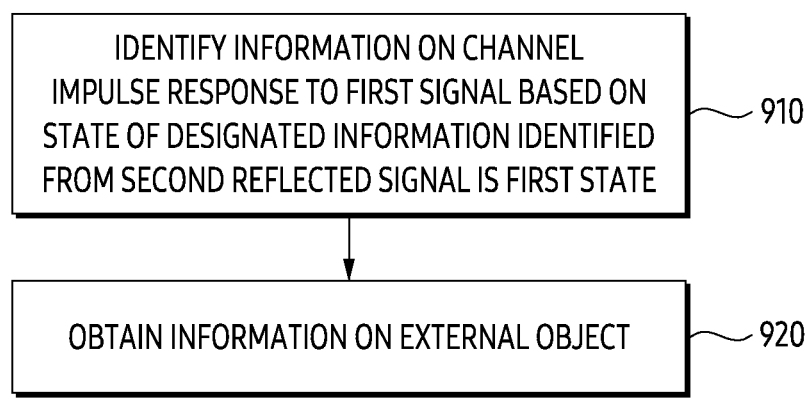
FIG. 9 is another flowchart illustrating an operation of an electronic device according to various embodiments.

FIG. 9 is another flowchart illustrating an operation of an electronic device according to various embodiments. This method may be executed by the electronic device 101 illustrated in FIG. 2 and/or the processor 120 of the electronic device 101.

Referring to FIG. 9, operations 910 to 920 may be related to operation 540 of FIG. 5. In operation 910, the processor 120 may identify information on a channel impulse response obtained from the first reflected signal based on the state of the designated information identified from the second reflected signal being the first state. The processor 120 may identify that the designated information identified from the second reflected signal is the same as the designated information set when the first signal is transmitted. The processor 120 may identify the state of the designated information identified from the second reflected signal as the first state based on the designated information identified from the second reflected signal being the same as the designated information set at the time of transmitting the first signal. The processor 120 may identify the state of the designated information identified from the second reflected signal as the first state based on the designated information identified from the second reflected signal corresponding to the designated information set at the time of transmitting the first signal. In the first state, the designated information identified from the second reflected signal may correspond to the designated information included in the second signal.

For example, the designated information may include information on a sequence. The processor 120 may identify the state of the designated information identified from the second reflected signal as the first state based on the sequence identified from the second reflected signal and the sequence established at the time of transmitting the first signal being the same (and/or corresponding).

According to an embodiment, the processor 120 may receive one reflected signal for the first frame. One reflected signal may be divided into a first reflected signal and a second reflected signal according to a time interval (or a field in the first frame). The processor 120 may divide one reflected signal for the first frame into a first reflected signal and a second reflected signal. For example, after receiving the first reflected signal, the processor 120 may receive the second reflected signal. The processor 120 may store the first reflected signal (or information on the first reflected signal) in the memory. The processor 120 may identify a state of the designated information based on the second reflected signal.

The processor 120 may identify the stored first reflected signal based on the state of the information identified from the second reflected signal being the first state. The processor 120 may identify information on the stored first reflected signal based on the state of the information identified from the second reflected signal being the first state. The information on the first reflected signal may include information on a channel impulse response obtained from the first reflected signal.

In operation 920, the processor 120 may obtain information on an external object. The processor 120 may obtain information on an external object based on the information on the channel impulse response. For example, the processor 120 may obtain information on the shape of the external object based on the information on the channel impulse response. For another example, the processor 120 may obtain information on the location of the external object based on the information on the channel impulse response. As another example, the processor 120 may obtain information on the movement (or state) of the external object based on the information on the channel impulse response. According to an embodiment, the processor 120 may obtain biometric information of a user of the electronic device 101, which is an external object, based on the information on the channel impulse response.

Figure 10:
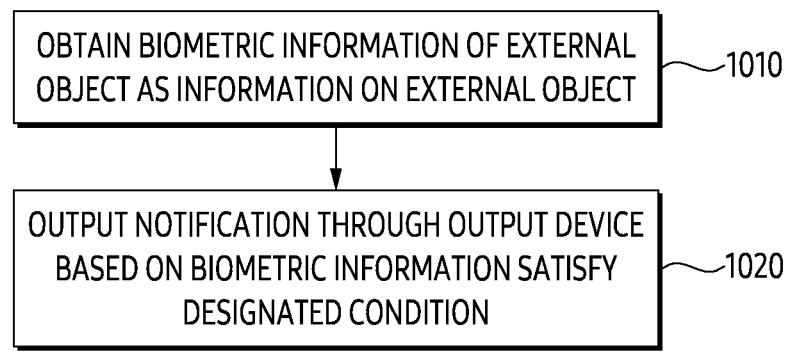
FIG. 10 is another flowchart illustrating an operation of an electronic device according to various embodiments.

FIG. 10 is another flowchart illustrating an operation of an electronic device according to various embodiments. This method may be executed by the electronic device 101 illustrated in FIG. 2 and/or the processor 120 of the electronic device 101.

Referring to FIG. 10, operations 1010 to 1020 may be related to operation 920. In operation 1010, biometric information of the external object may be obtained as information on the external object. The processor 120 may obtain biometric information of the user of the electronic device 101 as external object information on the external object. For example, the processor 120 may transmit one signal for the first frame. The one signal may be divided into a first signal and a second signal according to time (or field). For example, the processor 120 may transmit a first signal and a second signal.

The one transmitted signal may be reflected from the user's chest. For example, the first signal and the second signal may be reflected from the user's chest. The processor 120 may receive one reflected signal for one signal. The one reflected signal may be divided into a first reflected signal and a second reflected signal according to time (or field). The processor 120 may receive a first reflected signal for the first signal and a second reflected signal for the second signal. The processor 120 may acquire biometric information of the user through information on the channel impulse response obtained from the first reflected signal based on the second reflected signal. For example, the processor 120 may obtain information on the movement of the user's chest based on the information on the channel impulse response. The processor 120 may obtain information on the user's heart rate or breathing cycle based on information on the user's chest movement. As another example, the processor 120 may obtain information on a user's vital signs based on the information on the channel impulse response.

In operation 1020, the processor 120 may output a notification through the output device 220 based on whether the biometric information of the external object satisfies a designated condition. The processor 120 may output a notification through the output device 220 based on the biometric information of the user of the electronic device 101 satisfying a designated condition.

For example, the processor 120 may identify that the breathing cycle of the user of the electronic device 101 is greater than or equal to a designated cycle. The processor 120 may output a notification through the output device 220 based on the user's breathing cycle of the electronic device 101 being greater than or equal to a designated cycle.

As another example, the processor 120 may obtain information on the vital signs of the user of the electronic device 101. The processor 120 may identify that the vital signs of the user have rapidly (or suddenly) changed. The processor 120 may output a notification through the output device 220 based on identifying that the user's vital signs have changed rapidly.

According to an embodiment, the processor 120 may store (and/or record) the user's biometric information that is changed over time based on the user's biometric information of the electronic device 101 satisfying a designated condition.

For example, the processor 120 may identify that the user's breathing cycle of the electronic device 101 is maintained at a constant cycle. The processor 120 may store (and/or record) information on a breathing cycle that changes over time based on the fact that the user's breathing cycle of the electronic device 101 is maintained at a constant cycle.

Figure 11:
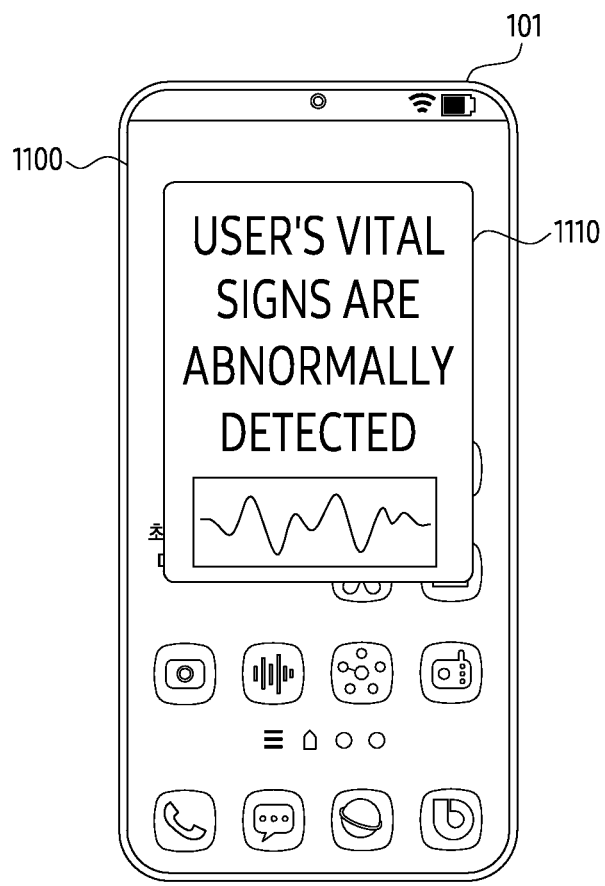
FIG. 11 illustrates an example of an operation of outputting a notification in an electronic device according to various embodiments.

FIG. 11 illustrates an example of an operation of outputting a notification in an electronic device according to various embodiments.

Referring to FIG. 11, the output device 220 of the electronic device 101 may include a display module (e.g., the display module 160 of FIG. 1). The processor 120 may identify that the user's biometric information of the electronic device 101 satisfies a designated condition. The processor 120 may output a notification 1110 based on identifying that the user's biometric information of the electronic device 101 satisfies a designated condition.

For example, the processor 120 may identify that the vital signs of the user of the electronic device 101 have changed rapidly. The processor 120 may display the screen 1100 through the display module based on identifying that the user's vital signs have changed rapidly. The processor 120 may output a screen 1100 including a notification 1110 indicating that the vital signs of the user have changed rapidly.

FIG. 11 illustrates an example of outputting a notification through a display module, but is not limited thereto. The notification may be output in various ways.

For example, the output device 220 may include a sound output module (e.g., the sound output module 155 of FIG. 1). The processor 120 may provide a notification to the user of the electronic device 101 through sound based on identifying that the biometric information of the user of the electronic device 101 satisfies a designated condition.

According to an embodiment, the processor 120 may transmit the user's biometric information to an external electronic device or server based on identifying that the user's biometric information satisfies a designated condition. For example, the processor 120 may transmit a request signal for providing a notification through the external electronic device to the external electronic device based on identifying that the user's biometric information satisfies a designated condition.

Figure 12:
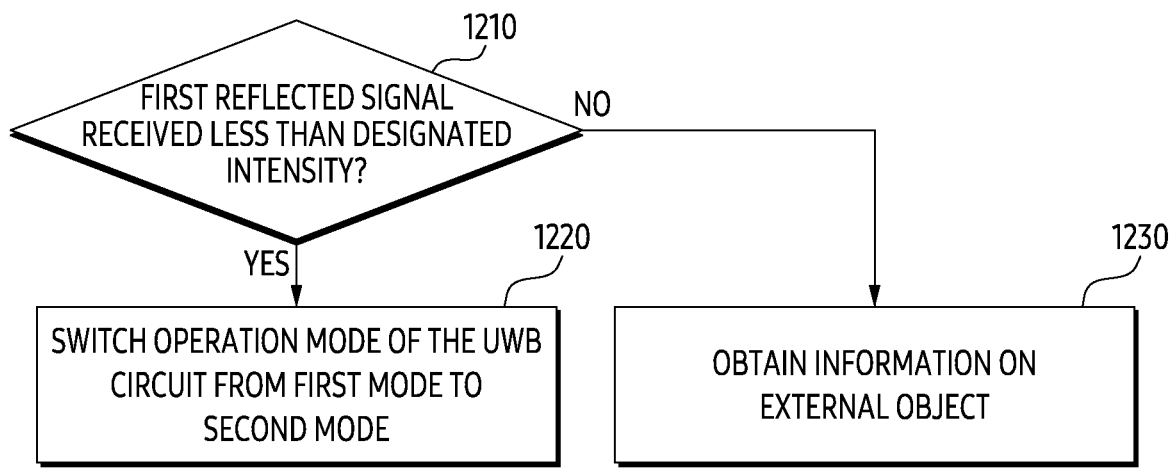
FIG. 12 is another flowchart illustrating an operation of an electronic device according to various embodiments.

FIG. 12 is another flowchart illustrating an operation of an electronic device according to various embodiments. This method may be executed by the electronic device 101 and the processor 120 of the electronic device 101 illustrated in FIG. 2.

Referring to FIG. 12, operations 1210 to 1230 may be related to operation 540 of FIG. 5. In operation 1210, the processor 120 may identify whether the first reflected signal is received less than a designated intensity.

The processor 120 may transmit the first frame through one signal. The one signal may be divided into a first signal and a second signal according to time (or field). The processor 120 may receive one reflected signal for one signal for transmitting the first frame. The one reflected signal may be divided into a first reflected signal and a second reflected signal according to time (or field).

For example, the processor 120 may transmit a first signal for a first field in the first frame and a second signal for a second field in the first frame. The processor 120 may receive a first reflected signal for the first signal. The processor 120 may receive a second reflected signal for the second signal.

The processor 120 may receive a first reflected signal for the first signal and a second reflected signal for the second signal. The processor 120 may identify that the state of the designated information identified from the second reflected signal is the first state. Based on identifying that the state of the designated information identified from the second reflected signal is the first state, the processor 120 may identify whether the first reflected signal for the first signal is received less than a designated intensity.

In operation 1220, when the first reflected signal is received with less than the designated intensity, the processor 120 may switch the operation mode of the UWB circuit from the first mode to the second mode. The processor 120 may switch the operation mode of the UWB circuit from the first mode to the second mode based on the first reflected signal being received with less than a designated intensity. The processor 120 may transmit the second frame through the UWB circuit operating in the second mode.

In operation 1230, when the first reflected signal is not received with less than the designated intensity, the processor 120 may obtain information on the external object through information on the channel impulse response obtained from the first reflected signal. When the first reflected signal is received at a designated intensity or more, the processor 120 may obtain information on an external object through information on a channel impulse response obtained from the first reflected signal.

According to operations 1210 to 1230, even when the state of the designated information identified from the second reflected signal is the first state, based on the first reflected signal being received with less than the designated intensity, the processor 120 may change the operation mode of the UWB circuit from the first mode to the second mode.

According to an embodiment, the processor 120 may identify whether the first reflected signal is received less than a designated intensity while receiving the first reflected signal. The processor 120 may not receive the second reflected signal based on the reception of the first reflected signal being less than the designated intensity. The processor 120 may omit an operation of receiving the second reflected signal based on the reception of the first reflected signal less than a designated intensity. The processor 120 may switch the operation mode of the UWB circuit from the first mode to the second mode instead of receiving the second reflected signal based on the reception of the first reflected signal less than a designated intensity.

Figure 13:
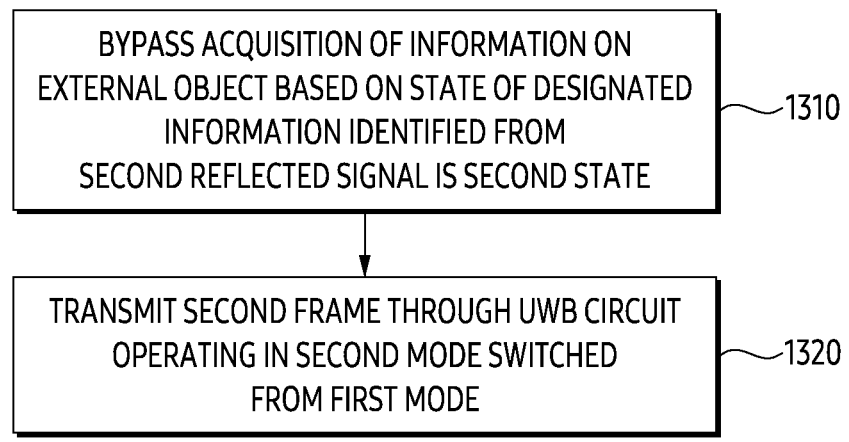
FIG. 13 is another flowchart illustrating an operation of an electronic device according to various embodiments.

FIG. 13 is another flowchart illustrating an operation of an electronic device according to various embodiments. This method may be executed by the electronic device 101 and/or the processor 120 of the electronic device 101 illustrated in FIG. 2.

Referring to FIG. 13, operations 1310 to 1320 may be related to operation 540 of FIG. 5. In operation 1310, the processor 120 may bypass the acquisition of information on an external object based on the state of the designated information identified from the second reflected signal is the second state.

The processor 120 may identify that the designated information identified from the second reflected signal is different from the designated information set when the second signal is transmitted. The processor 120 may identify that the state of the designated information identified from the second reflected signal is the second state based on identifying that the designated information identified from the second reflected signal is different from the designated information set when the second signal is transmitted. The processor 120 may identify the state of the designated information identified from the second reflected signal as the second state, based on distinguishing the designated information identified from the second reflected signal from the designated information set when the first signal is transmitted. In the second state, the designated information identified from the second reflected signal may be distinguished from the designated information included in the second signal.

For example, the designated information may include information on a sequence. The processor 120 may identify the state of the designated information identified from the second reflected signal as the second state based on the distinction between the sequence identified from the second reflected signal and the sequence set at the time of transmission of the first reflected signal.

The processor 120 may bypass the acquisition of information on an external object based on the state of the designated information identified from the second reflected signal being the second state. The processor 120 may omit the acquisition of information on an external object based on the state of the designated information identified from the second reflected signal being the second state. The processor 120 may switch the operation mode of the UWB circuit from the first mode to the second mode instead of obtaining information on the external object based on the state of the designated information identified from the second reflected signal is the second state.

In operation 1320, the processor 120 may transmit the second frame through the UWB circuit operating in the second mode switched from the first mode.

Figure 14:
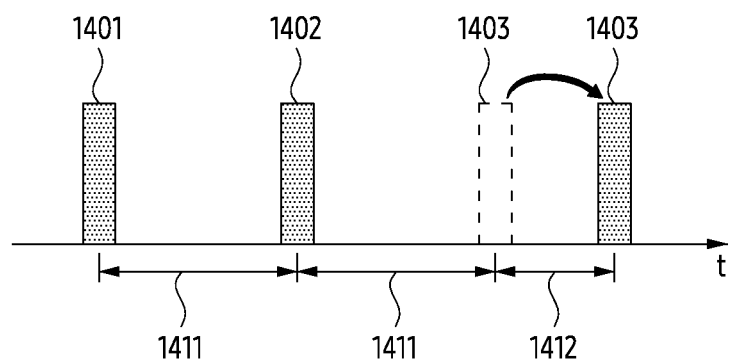
FIG. 14 is another flowchart illustrating an operation of an electronic device according to various embodiments.
Figure 15:
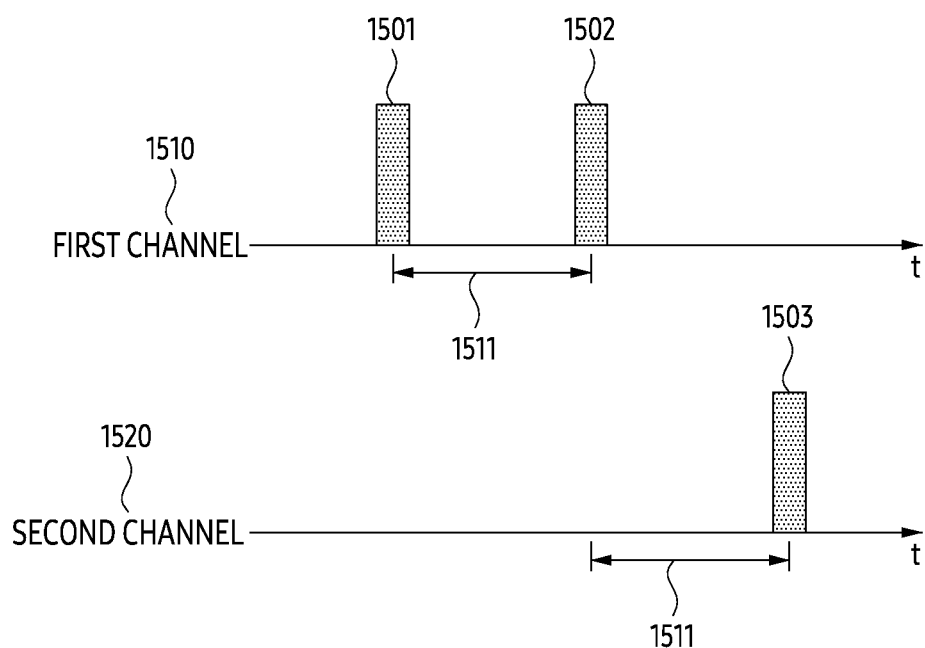
FIG. 15 is another flowchart illustrating an operation of an electronic device according to various embodiments.

In FIGS. 14 and 15 below, an example of an operation of the processor 120 for transmitting the second frame through the UWB circuit operating in the second mode switched from the first mode may be described.

FIG. 14 illustrates another example of an operation of an electronic device according to various embodiments.

Referring to FIG. 14, the processor 120 may transmit a frame 1401 and a frame 1402 based on a period 1411. The processor 120 may transmit the frame 1401 and transmit the frame 1402 after a time period corresponding to the period 1411 has elapsed. The processor 120 may transmit the frame 1401 and the frame 1402 based on a first offset (not shown). For example, the first offset may be set to a first value (e.g., 0).

The processor 120 may transmit a first signal for the first field of the frame 1402 and a second signal for the second field of the frame 1402. The processor 120 may receive a first reflected signal for the first signal and a second reflected signal for the second signal. The processor 120 may identify a state of designated information identified from the second reflected signal. The processor 120 may identify that the state of the designated information identified from the second reflected signal is the second state. The processor 120 may switch the operation mode of the UWB circuit from the first mode to the second mode based on identifying that the state of the designated information identified from the second reflected signal is the second state. The processor 120 may transmit the frame 1403 through the UWB circuit operating in the second mode. The processor 120 may transmit the frame 1403 based on the second offset 1412. The processor 120 may transmit the frame 1403 and at least one frame transmitted after the frame 1403 based on the period 1411.

For example, the processor 120 may perform a random back-off based on identifying that the state of the designated information identified from the second reflected signal is the second state. For example, the processor 120 may switch a transmission timing of a frame (e.g., frame 1403) transmitted at a designated period. The processor 120 may set a back-off counter as a random value. The processor 120 may reduce the set back-off counter value based on a designated time. The processor 120 may identify that the set back-off counter value is 0. The processor 120 may transmit the frame 1403 in response to the set back-off counter value being 0. A time interval until the back-off counter value is reduced to 0 may be referred to as a second offset 1412.

According to an embodiment, the processor 120 may set the first offset (not shown) and the second offset 1412 to be the same. For example, the first offset (not shown) and the second offset 1412 may be set to a first value (e.g., 0). The processor 120 may transmit the frame 1403 and at least one frame transmitted after the frame 1403 through a period distinguished from the period 1411 through the UWB circuit operating in the second mode.

FIG. 15 illustrates another example of an operation of an electronic device according to various embodiments.

Referring to FIG. 15, the processor 120 may transmit a frame 1501 and a frame 1502 through a first channel 1510 based on a period 1511. The processor 120 may transmit the frame 1501 within the first channel 1510, and transmit the frame 1502 after a time period corresponding to the period 1511 has elapsed.

The processor 120 may transmit a first signal for the first field of the frame 1502 and a second signal for the second field of the frame 1502. The processor 120 may receive a first reflected signal for the first signal and a second reflected signal for the second signal. The processor 120 may identify a state of designated information identified from the second reflected signal. The processor 120 may identify that the state of the designated information identified from the second reflected signal is the second state. The processor 120 may change the operation mode of the UWB circuit from the first mode to the second mode based on identifying that the state of the designated information identified from the second reflected signal is the second state.

According to an embodiment, the processor 120 may transmit a signal (or frame) through the first channel 1510 through the UWB circuit operating in the first mode. The processor 120 may transmit a signal (or frame) through the second channel 1520 through the UWB circuit operating in the second mode.

For example, the processor 120 may transmit the frame 1503 through a UWB circuit operating in the second mode. The processor 120 may change the channel through which the frame (e.g., the frame 1503) is transmitted from the first channel 1510 to the second channel 1520. The processor 120 may transmit the frame 1503 within the second channel 1520. The processor 120 may transmit the frame 1503 based on the period 1511.

Figure 16:
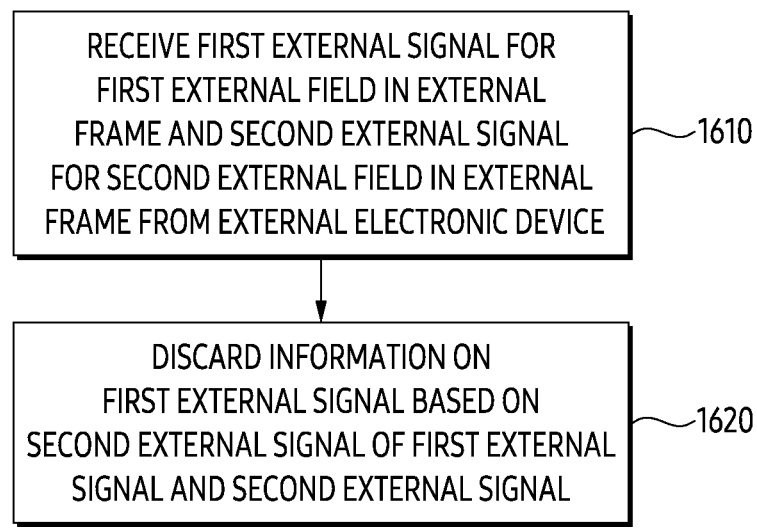
FIG. 16 is another flowchart illustrating an operation of an electronic device according to various embodiments.

FIG. 16 is another flowchart illustrating an operation of an electronic device according to various embodiments. This method may be executed by the electronic device 101 and the processor 120 of the electronic device 101 illustrated in FIG. 2.

Referring to FIG. 16, the processor 120 may receive a first external signal for a first external field in an external frame and a second external signal for a second external field in the external frame from an external electronic device. The first external signal transmitted from the external electronic device may be related to the first signal. The second external signal transmitted from the external electronic device may be related to the second signal.

For example, in order to obtain information on the first external object, the processor 120 may transmit a first signal for the first field in the first frame and a second signal for the second field in the first frame. Similarly, an external electronic device (e.g., a processor of an external device) may transmit a first external signal to a first external field in an external frame and a second external signal to a second external field in the external frame in order to obtain information on the second external object. According to an embodiment, the first external object and the second external object may refer to the same external object.

The processor 120 may receive the first external signal. The processor 120 may not distinguish the first external signal from the first signal transmitted from the processor 120. After receiving the first external signal, the processor 120 may receive the second external signal. The processor 120 may identify information on the first external signal.

In operation 1620, the processor 120 may discard information on the first external signal based on the second external signal of the first external signal and the second external signal.

For example, the processor 120 may identify designated information from the second external signal. The processor 120 may identify that the designated information identified from the second external signal is different from the set designated information when the second signal is transmitted. The processor 120 may identify that the first external signal and the second external signal are distinguished from the first signal and the second signal transmitted from the processor 120 based on identifying that the designated information identified from the second external signal is different from the set designated information when the second signal is transmitted. The processor 120 may discard information on the first external signal.

According to an embodiment, instead of obtaining information on the first external object based on the first external signal, the processor 120 may wait to receive the first reflected signal for the first signal and the second reflected signal for the second signal. According to an embodiment, the processor 120 may transmit a second frame instead of obtaining information on the first external object based on the first external signal.

According to various embodiments, an electronic device (for example, the electronic device 101 of FIG. 2) may comprise an ultra-wide band (UWB) circuit (for example, the UWB circuit 210 of FIG. 2), at least one processor comprising a controller of UWB circuit, the at least one processor may be configured to: transmit, through the UWB circuit operating in a first mode, a first signal for a first field in a first frame; transmit, through the UWB circuit operating in the first mode, a second signal including designated information for a second field in the first frame, that is distinct from the first signal; receive, through the UWB circuit operating in the first mode, a first reflected signal related to the first signal and a second reflected signal related to the second signal, respectively, caused by an external object; according to a state of the designated information identified from the second reflected signal, obtain information on the external object based on the first reflected signal or transmit a second frame through the UWB circuit operating in a second mode switched from the first mode.

According to an embodiment, the at least one processor may be configured to transmit the second signal, through the UWB circuit operating in the first mode after a designated time interval has elapsed from the timing at which the first signal was transmitted.

According to an embodiment, the at least one processor may be configured to obtain the information on the external object through information on channel impulse response obtained from the first reflected signal based on the state of the designated information identified from the second reflected signal being a first state and the designated information identified from the second reflected signal may correspond to the designated information included in the second signal in the first state.

According to an embodiment, the electronic device (for example, the output device 220 of FIG. 2) may further comprise an output device, and the at least one processor may be configured to: obtain biometric information of the external object as the information on the external object, and output, through output device, a notification based on the biometric information that satisfies a designated condition.

According to an embodiment, the information on the external object may comprise at least one of information on shape of the external object, information on location of the external object, and information on movement of the external object.

According to an embodiment, the at least one processor may be configured to: bypass obtaining the information on the external object based on the state of the designated information identified from the second reflected signal being a second state, and transmit, through the UWB circuit operating in the second mode switched from the first mode, the second frame, and; the designated information identified from the second reflected signal may be distinct from the designated information included in the second signal in the second state.

According to an embodiment, at least part of the first field may be configured based on a first sequence, and the designated information may comprise information on a second sequence for configuring the second field, and the second sequence for configuring the second field may be distinct from the first sequence configuring at least part of the first field.

According to an embodiment, the at least one processor may be configured to: identify third sequence based on the second reflected signal, and identify the state of the designated information identified from the second reflected signal based on the second sequence and the third sequence identified.

According to an embodiment, the second frame may comprise the first field and third field, and the third filed may be configured based on fourth sequence distinct from second sequence configuring the second field.

According to an embodiment, the at least one processor may be configured to: identify that the third sequence identified based on the second reflected signal corresponds to the second sequence, and based on identifying that the third sequence corresponds to the second sequence, identify the state of the designated information as the first state.

According to an embodiment, the at least one processor may be configured to: identify whether the first reflected signal has been received with less than a designated intensity, and switch an operation mode of the UWB circuit from the first mode to the second mode based on the first reflected signal being received with less than a designated intensity.

According to an embodiment, the at least one processor may be configured to: bypass an operation for measuring a channel condition for transmitting the first signal and the second signal, and transmit, through the UWB circuit operating in the first mode, the first signal.

According to an embodiment, the designated information may comprise unique identification information for the electronic device.

According to an embodiment, the at least one processor may be configured to transmit, through the UWB circuit operating in the first mode, the first frame based on first period.

According to an embodiment, the first frame may be transmitted according to the first period based on first offset, and the second frame may be transmitted according to the second period based on second offset distinct from the first offset.

According to an embodiment, the at least one processor may be set to transmit the second frame based on a second period distinguished from the first period through the UWB circuit operating in the second mode switched from the first mode.

According to an embodiment, the first frame may be transmitted in first channel through the UWB circuit (for example, the UWB circuit 210 of FIG. 2) operating in the first mode, and the second frame may be transmitted in second channel distinct from the first channel through the UWB circuit operating in the second mode.

According to an embodiment, a method of an electronic device (for example, the electronic device 101 of FIG. 2) may comprise transmitting, through an UWB circuit operating in a first mode, a first signal for a first field in a first frame; transmitting, through the UWB circuit operating in the first mode, a second signal including designated information for a second field in the first frame, that is distinct from the first signal; receiving, through the UWB circuit operating in the first mode, a first reflected signal related to the first signal and a second reflected signal related to the second signal, respectively, caused by an external object; according to a state of the designated information identified from the second reflected signal, obtaining information on the external object based on the first reflected signal or transmit a second frame through the UWB circuit operating in a second mode switched from the first mode.

According to an embodiment, the method may further comprise obtaining the information on the external object through information on channel impulse response obtained from the first reflected signal based on the state of the designated information identified from the second reflected signal being a first state, and the designated information identified from the second reflected signal may correspond to the designated information included in the second signal in the first state.

According to an embodiment, the method may further comprise bypassing obtaining the information on the external object based on the state of the designated information identified from the second reflected signal being a second state, and transmitting, through the UWB circuit operating in the second mode switched from the first mode, the second frame, and; the designated information identified from the second reflected signal may be distinct from the designated information included in the second signal in the second state.

According to an embodiment, computer readable storage medium may store one or more programs, the one or more programs including one or more instructions causing, when the electronic device to transmit, through an UWB circuit (for example, the UWB circuit 210 of FIG. 2) operating in a first mode, a first signal for a first field in a first frame; transmit, through the UWB circuit operating in the first mode, a second signal including designated information for a second field in the first frame, that is distinct from the first signal; receive, through the UWB circuit operating in the first mode, a first reflected signal related to the first signal and a second reflected signal related to the second signal, respectively, caused by an external object; according to a state of the designated information identified from the second reflected signal, obtain information on the external object based on the first reflected signal or transmit a second frame through the UWB circuit operating in a second mode switched from the first mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. An electronic device comprising:
ultra-wide band (UWB) circuitry;
memory, storing one or more instructions, comprising one or more storage media; and
at least one processor comprising circuitry configured to control the UWB circuitry,
wherein the one or more instructions, when executed by the at least one processor, individually or collectively, cause the electronic device to:
transmit, through the UWB circuitry operating in a first transmission mode for a first period, a first frame by transmitting a first signal for a first field and a second signal for a second field including reference information;

receive, through the UWB circuitry, a first reflected signal related to the first signal and a second reflected signal related to the second signal, respectively, caused by an external object;

based on a state of the reference information identified from the second reflected signal being a first state, obtain information on the external object based on the first reflected signal; and based on the state of the reference information being a second state, transmit a second frame by transmitting a third signal for the first field and a fourth signal for the second field, through the UWB circuitry operating in a second transmission mode for a second period different from the first period, switched from the first transmission mode.

2. The electronic device according to claim 1, wherein the one or more instructions, when executed by the at least one processor, individually or collectively, cause the electronic device to:

transmit the second signal, through the UWB circuitry, operating in the first transmission mode after a reference time interval has elapsed from a timing at which the first signal is transmitted.

3. The electronic device according to claim 1, wherein the one or more instructions, when executed by the at least one processor, individually or collectively, cause the electronic device to:

identify that the reference information identified from the second reflected signal corresponds to the reference information;

identify, based on identifying that the reference information identified from the second reflected signal corresponds to the reference information, the state of the reference information as the first state; and obtain, based on the information on channel impulse response obtained from the first reflected signal, the information on the external object.

4. The electronic device according to claim 3, further comprising an output device, wherein the one or more instructions, when executed by the at least one processor, individually or collectively, cause the electronic device to:

obtain biometric information of the external object, included in the information on the external object; and output, through the output device, a notification based on the biometric information satisfies a reference condition.

5. The electronic device according to claim 1, wherein the information on the external object comprises at least one of information on a shape of the external object, information on a location of the external object, and information on a movement of the external object.

6. The electronic device according to claim 1, wherein the one or more instructions, when executed by the at least one processor, individually or collectively, cause the electronic device to:

identify that the reference information identified from the second reflected signal distinct from the reference information;

identify, based on identifying that the reference information identified from the second reflected signal corresponds to the reference information, the state of the reference information as the second state;

bypass obtaining the information on the external object based on the state of the reference information identified from the second reflected signal being the second state; and transmit, through the UWB circuitry operating in the second transmission mode for the second period, the second frame.

7. The electronic device according to claim 1, wherein at least a portion of the first field is configured based on a first sequence, wherein the reference information comprises a second sequence, and wherein the second sequence is distinct from the first sequence.

8. The electronic device according to claim 7, wherein the one or more instructions, when executed by the at least one processor, individually or collectively, cause the electronic device to:

identify a third sequence based on the second reflected signal; and identify, based on the second sequence and the identified third sequence, the state of the reference information identified from the second reflected signal.

9. The electronic device according to claim 8, wherein the second field is configured based on a fourth sequence distinct from the second sequence.

10. The electronic device according to claim 8, wherein the one or more instructions, when executed by the at least one processor, individually or collectively, cause the electronic device to:

identify that the third sequence identified based on the second reflected signal corresponds to the second sequence; and based on identifying that the third sequence corresponds to the second sequence, identify the state of the reference information as the first state.

11. The electronic device according to claim 1, wherein the one or more instructions, when executed by the at least one processor, individually or collectively, cause the electronic device to:

identify whether the first reflected signal has been received with less than a reference intensity; and switch an operation mode of the UWB circuitry from the first transmission mode to the second transmission mode based on the first reflected signal being received with less than the reference intensity.

12. The electronic device according to claim 1, wherein the one or more instructions, when executed by the at least one processor, individually or collectively, cause the electronic device to:

bypass an operation for measuring a channel condition for transmitting the first signal and the second signal; and transmit, through the UWB circuitry operating in the first transmission mode, the first signal.

13. The electronic device according to claim 1, wherein the reference information comprises a unique identification number (UID) of the electronic device.

14. The electronic device according to claim 1, wherein the first frame is transmitted according to the first period based on a first offset.

15. The electronic device according to claim 14, wherein the second frame is transmitted according to the second period based on a second offset distinct from the first offset.

16. The electronic device according to claim 1, wherein the first frame is transmitted in first channel through the UWB circuitry operating in the first transmission mode, and wherein the second frame is transmitted in second channel distinct from the first channel through the UWB circuitry operating in the second transmission mode.

17. A method of an electronic device, the method comprising:
   transmitting, through an ultra-wide band (UWB) circuit operating in a first transmission mode for a first period, a first frame by transmitting a first signal for a first field and a second signal for a second field including reference information;
   receiving, through the UWB circuit, a first reflected signal related to the first signal and a second reflected signal related to the second signal, respectively, caused by an external object;
   based on a state of the reference information identified from the second reflected signal being a first state, obtaining information on the external object based on the first reflected signal; and
   based on the state of the reference information being a second state, transmitting a second frame by transmitting a third signal for the first field and a fourth signal for the second field, through the UWB circuit operating in a second transmission mode for a second period different from the first period, switched from the first transmission mode.

18. A non-transitory computer readable storage medium storing one or more programs, the one or more programs including instructions, which, when being executed by at least one processor of an electronic device with an ultra-wide band (UWB) circuit, cause the electronic device to:
   transmit, through the UWB circuit operating in a first transmission mode for a first period, a first frame by transmitting a first signal for a first field and a second signal for a second field including reference information;
   receive, through the UWB circuit, a first reflected signal related to the first signal and a second reflected signal related to the second signal, respectively, caused by an external object;
   based on a state of the reference information identified from the second reflected signal being a first state, obtain information on the external object based on the first reflected signal; and
   based on the state of the reference information being a second state, transmit a second frame by transmitting a third signal for the first field and a fourth signal for the second field, through the UWB circuit operating in a second transmission mode switched for a second period different from the first period, from the first transmission mode.

19. The method according to claim 17, wherein the method comprises:
   identifying that the reference information identified from the second reflected signal distinct from the reference information;
   identifying, based on identifying that the reference information identified from the second reflected signal corresponds to the reference information, the state of the reference information as the second state;
   bypassing obtaining the information on the external object based on the state of the reference information identified from the second reflected signal being the second state; and
   transmitting, through the UWB circuit operating in the second transmission mode for the second period, the second frame.

20. The electronic device according to claim 1, wherein the one or more instructions, when executed by the at least one processor, individually or collectively, cause the electronic device to:
   acquire biometric information of a user based on the first reflected signal and the second reflected signal;
   determine whether the biometric information of the user satisfies a reference condition; and
   output a notification based on a determination that the biometric information of the user satisfies the reference condition,
   wherein the biometric information of the user comprises at least one of a breathing cycle or a heart rate.

* * * * *